United States Patent
Langereis et al.

(10) Patent No.: US 9,775,168 B2
(45) Date of Patent: Sep. 26, 2017

(54) METHODS ASSIGNING RESOURCES FOR DEDICATED SCHEDULING REQUESTS USING MAC MESSAGES AND RELATED WIRELESS TERMINALS AND BASE STATIONS

(71) Applicant: Telefonaktiebolaget L M Ericsson (publ), Stockholm (SE)

(72) Inventors: Alexander Langereis, Sigtuna (SE); Gunnar Bergquist, Kista (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 45 days.

(21) Appl. No.: 14/715,865

(22) Filed: May 19, 2015

(65) Prior Publication Data

US 2016/0345352 A1 Nov. 24, 2016

(51) Int. Cl.
*H04W 4/00* (2009.01)
*H04W 72/12* (2009.01)
*H04B 1/40* (2015.01)

(52) U.S. Cl.
CPC .......... *H04W 72/1284* (2013.01); *H04B 1/40* (2013.01)

(58) Field of Classification Search
None
See application file for complete search history.

(56) References Cited

U.S. PATENT DOCUMENTS

| | | | |
|---|---|---|---|
| 8,594,747 B2 | 11/2013 | Shukla et al. | |
| 2012/0281566 A1* | 11/2012 | Pelletier | H04W 76/046 370/252 |
| 2013/0044699 A1 | 2/2013 | Eriksson | |
| 2014/0064134 A1 | 3/2014 | Huang et al. | |
| 2014/0204815 A1 | 7/2014 | Ismail et al. | |
| 2015/0003391 A1* | 1/2015 | Chen | H04L 5/0092 370/329 |

FOREIGN PATENT DOCUMENTS

| | | |
|---|---|---|
| EP | 2 827 662 A1 | 1/2015 |
| WO | WO 2013/184050 A1 | 12/2013 |
| WO | WO 2014/109930 A1 | 7/2014 |
| WO | WO 2015/016755 A1 | 2/2015 |

OTHER PUBLICATIONS

International Search Report and Written Opinion of the International Searching Authority, Application No. PCT/SE2015/050553, Jan. 25, 2016.
Ericsson et al., "Investigation of PUCCH load", 3GPP TSG-RAN WG2 #78, Tdoc R2-122589, Prague, Czech Republic, May 21-25, 2012, 9 pp.
3GPP TS 36.212, Version 12.4.0 (Mar. 2015), $3^{rd}$ Generation Partnership Project; Technical Specification Group Radio Access Network; Evolved Universal Terrestrial Radio Access (E-UTRA); Multiplexing and channel coding (Release 12), 94 Pages.

* cited by examiner

*Primary Examiner* — Otis L Thompson, Jr.
(74) *Attorney, Agent, or Firm* — Sage Patent Group

(57) ABSTRACT

A method of operating a base station of a radio access network may include transmitting a Medium Access Control (MAC) message from the node of the RAN to a wireless terminal UE. The MAC message may include a Control Element CE defining an assignment of resources for dedicated scheduling requests D-SRs available for the wireless terminal (UE) to transmit dedicated scheduling requests to the node.

20 Claims, 24 Drawing Sheets

Figure 1
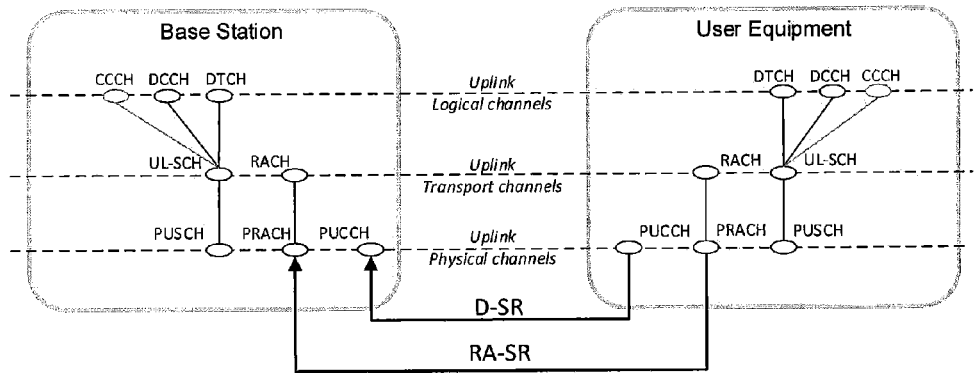
Figure 2
```
-- ASN1START
SchedulingRequestConfig ::= CHOICE (
    release                       Null,
    setup                         Sequence (
        sr-PUCCH-ResourceIndex        INTEGER (0..2047),
        sr-ConfigIndex                INTEGER (0..157),
        dsr-TransMax                  ENUMERATED (n4, n8, n16, n12, n64,
                                                  spare3, spare2, spare1) ) )
SchedulingRequestConfig-v1020 ::= SEQUENCE (
    Sr-PUCCH-ResourceIndexP1-r10  INTEGER (0..2047)  OPTIONAL --Need OR )
-- ASN1STOP
```
Figure 3
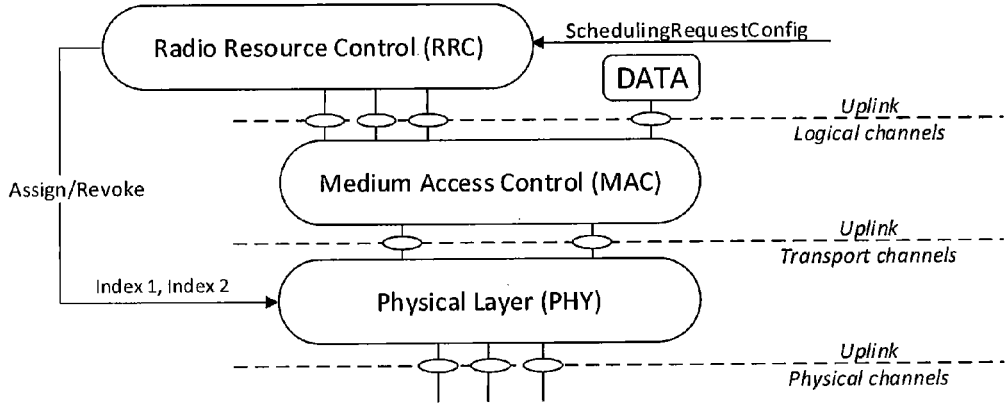

UE-specific Periodicity and subframe offset configurations for D-SR

| SR configuration Index Index | SR periodicity (ms) P | SR subframe offset O |
|---|---|---|
| 0 – 4 | 5 | Index |
| 5 – 14 | 10 | Index – 5 |
| 15 – 34 | 20 | Index – 15 |
| 35 – 74 | 40 | Index – 35 |
| 75 – 154 | 80 | Index – 75 |
| 155 – 156 | 2 | Index – 155 |
| 157 | 1 | Index – 157 |

Figure 6

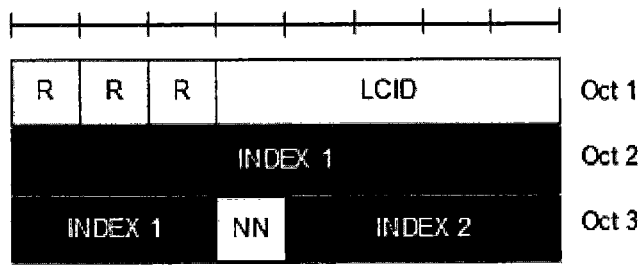

LCID = Logical Channel ID (36.321)
R = Reserved
Index 1 = Frequency Resource
Index 2 = Time Resource
NN = anonymous message bits (not relevant for inventive concepts)

Figure 7

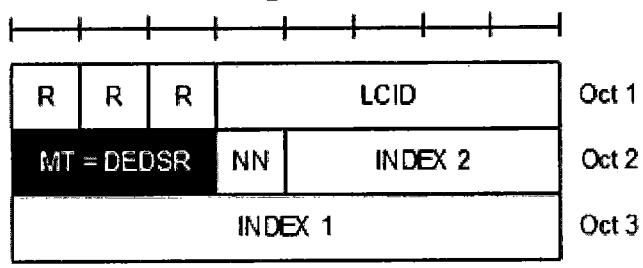

LCID = Logical Channel ID (36.321)
R = Reserved
Index 1 = Frequency Resource
Index 2 = Time Resource
MT = Message Type
NN = anonymous message bits (not relevant for inventive concepts)

Figure 8

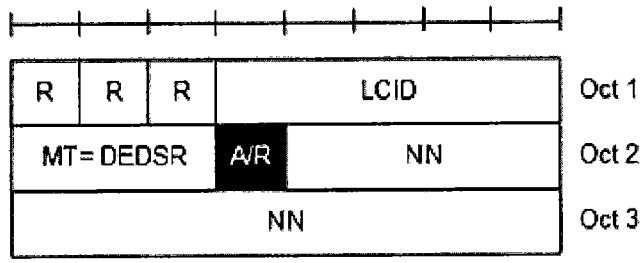

LCID = Logical Channel ID (36.321)
R = Reserved
MT = Message Type
NN = anonymous message bits (not relevant for inventive concepts)

LCID = Logical Channel ID (36.321)
R = Reserved
Index 1 = Frequency Resource
Index 2 = Time Resource
MT = Message Type
Q = Quick SR Repeat
NN = anonymous message bits (not relevant for inventive concepts)

Figure 10
UE-Specific periodicity and subframe offset configuration
| SR configuration Index Index 2 | SR periodicity (ms) P | SR subframe offset O | 8 Values if Q=0 | 8 Values if Q=1 |
|---|---|---|---|---|
| 0 – 4 | 5 | Index | 0(5) | 5(5) |
| 5 – 12 | 10 | Index – 5 | 8(8) | 0(8) |
| 13 – 14 | 10 | Index – 5 | 0(10) | (10) |
| 15 – 34 | 20 | Index – 15 | 0(20) | (20) |
| 35 – 74 | 40 | Index – 35 | 0(40) | (40) |
| 75 – 154 | 80 | Index – 75 | 0(80) | (80) |
| 155 – 156 | 2 | Index – 155 | 0(2) | 2(2) |
| 157 | 1 | Index – 157 | 0(1) | 1(1) |
| | | Sum: | 8 (158) values | 8 (158) values |
Figure 11
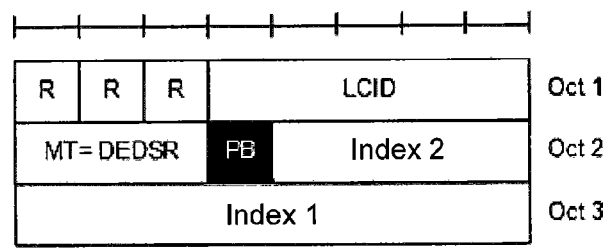
LCID = Logical Channel ID (36.321)
R = Reserved
Index 1 = Frequency Resource
Index 2 = Time Resource
MT = Message Type
PB = Piggy Back
Figure 12
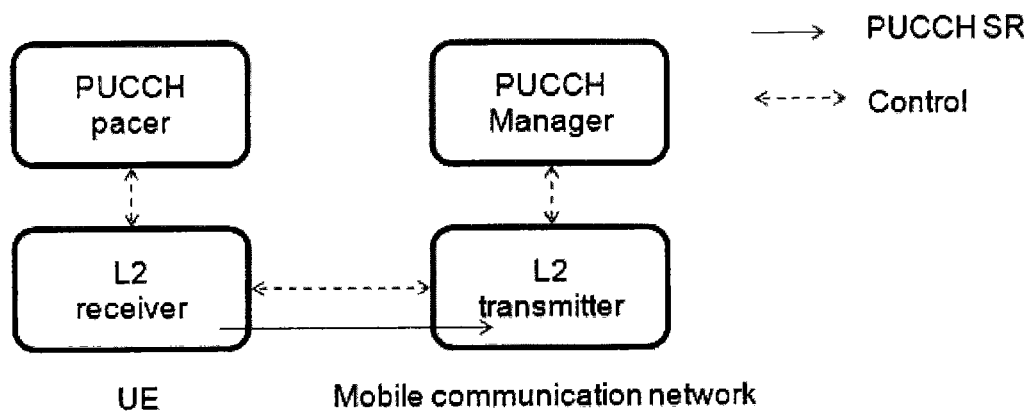

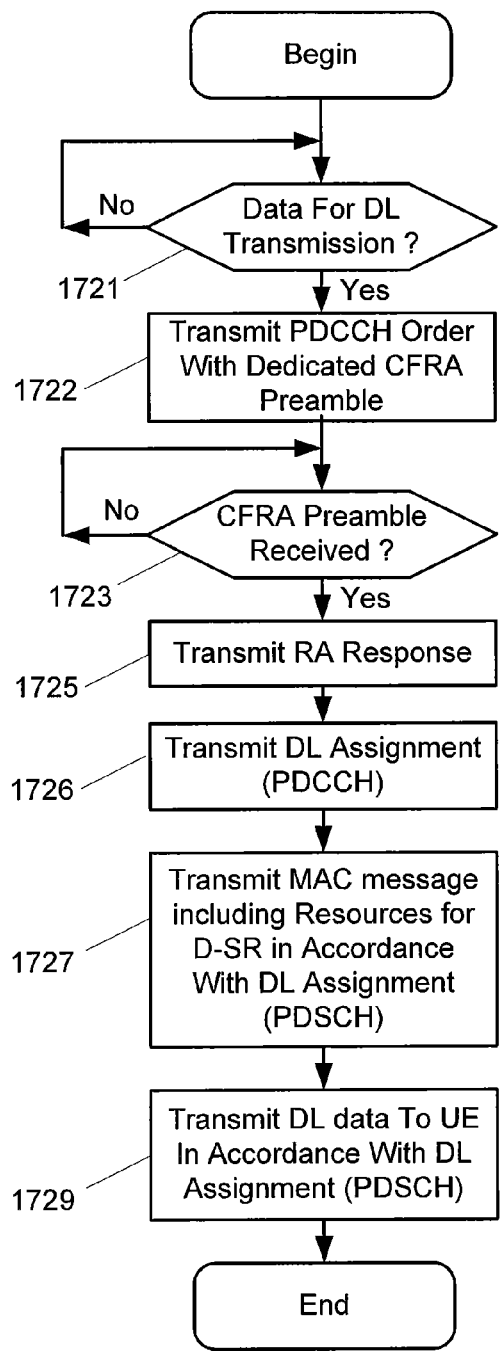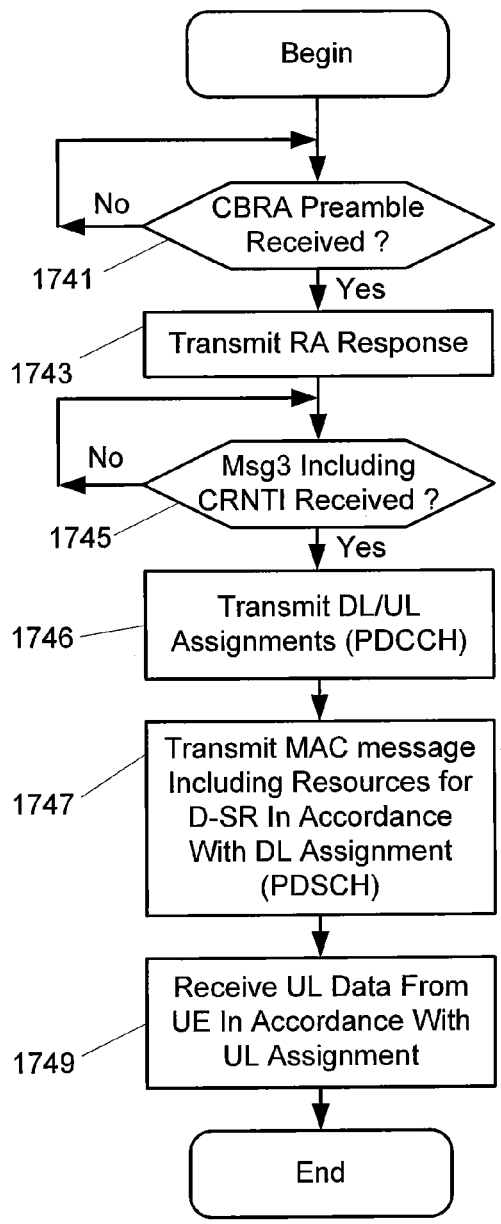

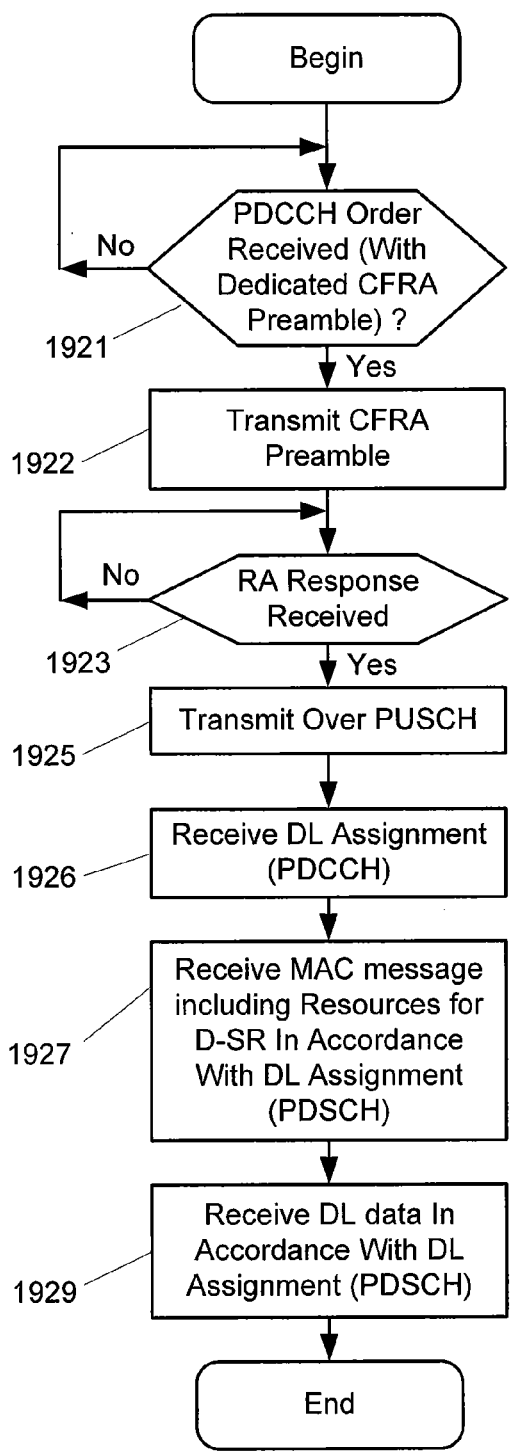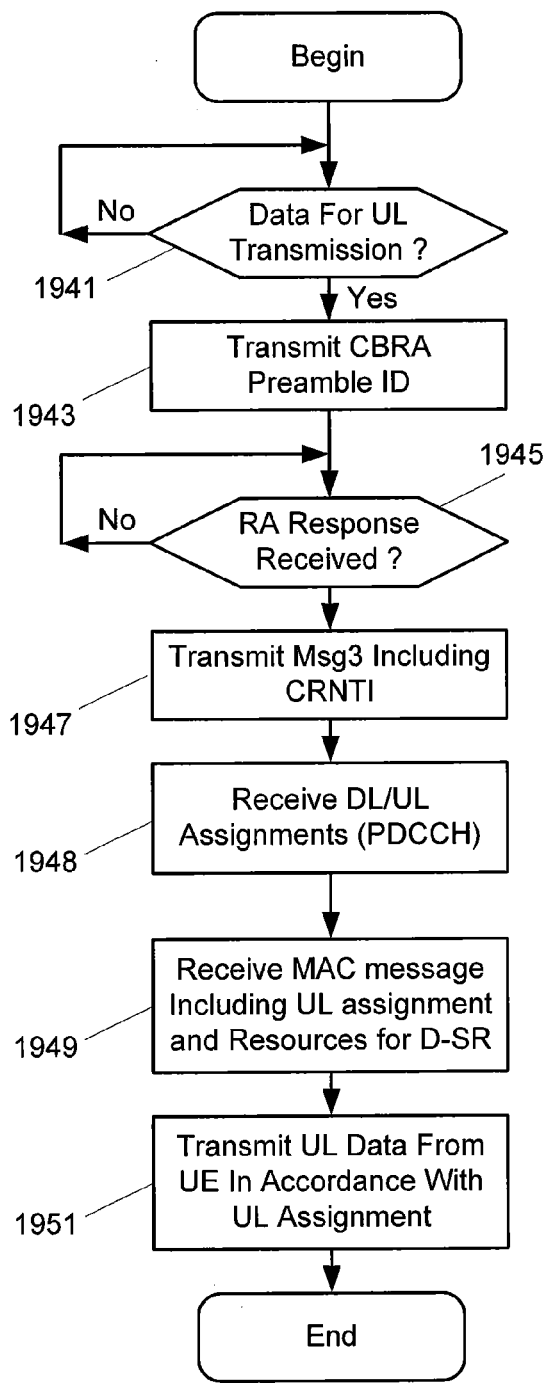

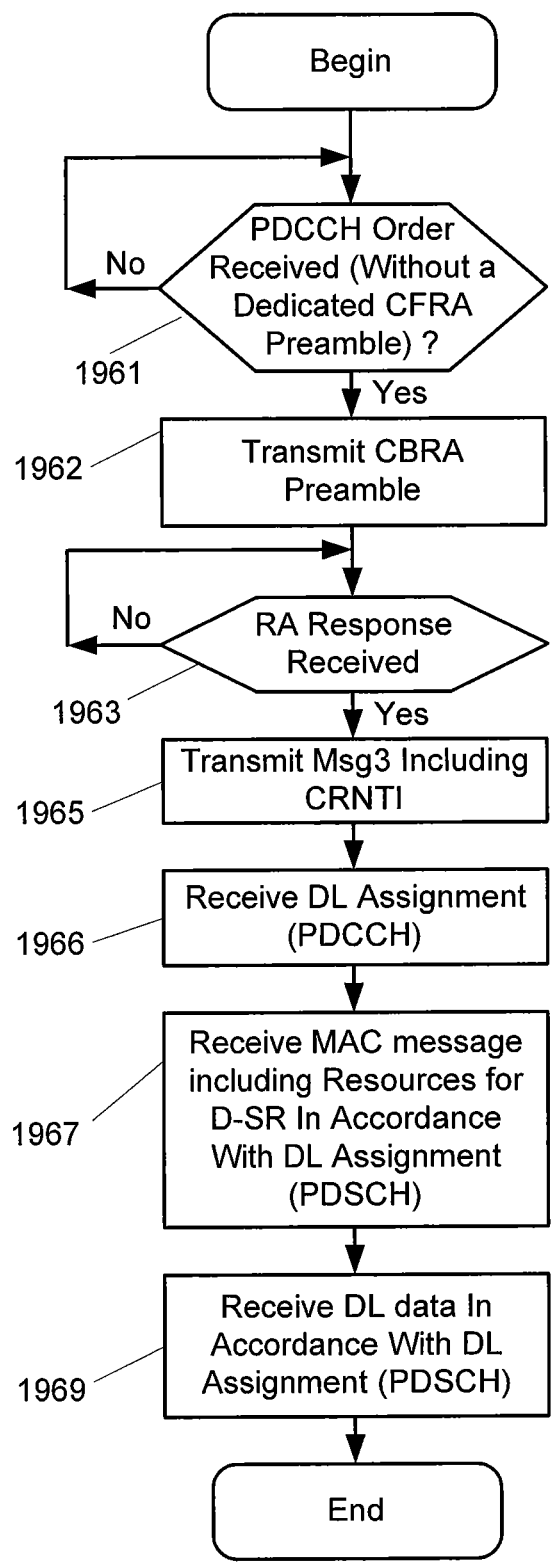

METHODS ASSIGNING RESOURCES FOR DEDICATED SCHEDULING REQUESTS USING MAC MESSAGES AND RELATED WIRELESS TERMINALS AND BASE STATIONS

BACKGROUND

Embodiments of the present disclosure generally relate to wireless communications, and more particularly, to uplink scheduling requests and related methods and user equipment and network nodes.

A Scheduling Request (SR) is used to request uplink shared channel (UL-SCH) resources for a dedicated data transmission from a user equipment node (also referred to as a wireless terminal, a user equipment, UE, etc.) to a network node (also referred to as a base station, an eNB, an eNodeB, etc.). A Scheduling Request SR may be sent as a Dedicated SR (D-SR) on the Physical Uplink Control Channel (PUCCH), or a Scheduling Request SR may be sent as Random Access Scheduling Request (RA-SR) by triggering a Random Access (RA) request for new UL scheduling resources on a Physical Random Access Channel (PRACH). FIG. 1 is a block diagram illustrating procedures and channels involved in such D-SR and RA-SR communications between a base station and a user equipment UE in an LTE (Long Term Evolution) uplink.

A D-SR may include one single bit of information that is transmitted from the UE to the base station, carried by the presence or absence of a preselected PUCCH format on a preconfigured PUCCH time/frequency resource. FIG. 1 illustrates the Evolved Universal Terrestrial Radio Access (E-UTRA) radio interface protocol architecture used above and around the physical layer. The physical layer is configured by the Radio Resource Control (RRC) Layer of Layer 3 and interfaces the Medium Access Control (MAC) sublayer of Layer 2. Resources for D-SR are assigned and revoked through explicit Radio Resource Control (RRC) signaling, and resources for D-SR may be implicitly released when the UE can no longer remain synchronized in the uplink.

FIG. 2 illustrates elements of a SchedulingRequestConfig information element according to 3GPP 36.331 (E-UTRA RRC) used to define resources for D-SR. In particular, RRC uses a SchedulingRequestConfig information element including a first 11 bit index sr-PUCCH-ResourceIndex (also referred to as Index-1) to define a code frequency domain of the PUCCH assigned for the D-SR resource(s), and a second 8 bit index sr-ConfigIndex (also referred to as Index-2) to define a time domain of the PUCCH assigned for the D-SR resource(s). The SchedulingRequestConfig information element thus defines a maximum set of transmission opportunities of a D-SR on PUCCH. FIG. 3 is a block diagram illustrating processing of a SchedulingRequestConfig information element using RRC and PHY.

Index-1 (sr-PUCCH-ResourceIndex) points to positions in code frequency space. Index-2 (sr-ConfigIndex) is coupled to a periodicity P and a subframe offset O as defined in the table of FIG. 4. Typical D-SR periodicities may range from 10-20 ms (corresponding to indices 5-14 and 15-34 of FIG. 4), with shorter 1, 2 and 5 ms periodicities (corresponding to indices 0-4, 155-156, and 157 of FIG. 4) being meant for data with critical latency requirements, and with longer 40 and 80 ms periodicities (corresponding to indices 35-74 and 75-154 of FIG. 4) being used for more relaxed data requirements.

In FIG. 4, the first column (SR configuration index) provides the index values used for sr-ConfigIndex (Index-2) of FIG. 2, the second column (SR periodicity P) provides the periodicity in milliseconds (ms) associated with the respective index value, and the third column (SR subframe offset O) provides the SR subframe offset associated with the respective index value (calculated as the index value minus the indicated integer). The base station may thus transmit a SchedulingRequestConfig message including one of the index values of FIG. 4 as an sr-ConfigIndex (Index-2) to the UE to identify D-SR resources available to the UE to make scheduling requests. Relatively short periodicity (high frequency) D-SR assignments (e.g., corresponding to indices 0-4 and 155-157) may provide reduced latency for a UE with data having relatively strict latency requirements at a cost of relatively high consumption of system resources. Intermediate periodicity (intermediate frequency) D-SR assignments (e.g., corresponding to indices 5-34) may provide intermediate latency for a UE with data having intermediate latency requirements. Relatively long periodicity (low frequency) D-SR assignments (e.g., corresponding to indices 35-154) may provide relatively low consumption of system resources at a cost of relatively high data latency.

Peak loads of LTE networks are steadily increasing, pushing capacity requirements measured in numbers of RRC Connected UEs per cell. Available capacity may depend on a number of resources, and more particularly, on semi-static PUCCH resources. If the system exhausts its PUCCH resources, the UEs may be required to use random access to request resources, and use of such random access requests may be a more tedious and time consuming procedure, compared to sending an SR over PUCCH. Increased use of random access requests may result in increased load on the resources for random access and such increased load may limit system capacity.

In LTE, uplink transmissions may only be allowed when the UE is synchronized in the uplink. If a UE is not synchronized in the uplink, the UE may be required to re-synchronize (using a random access procedure) before it is allowed to transmit anything other than a preamble (e.g., used for a random access request). Thus, each LTE UE that is RRC Connected may be either UL synchronized or not UL synchronized. As shown in FIG. 5, a UE can be in either an RRC Idle state or an RRC Connected state, and if a UE is in an RRC Connected state, the UE may be either not UL synchronized or UL synchronized.

By using PUCCH resources, UL and DL throughput may be improved and latency may be reduced for a UE in a UL Synchronized state, but as noted above, PUCCH resources may be relatively scarce, and thus, availability of such resources may be limited. Stated in other words, PUCCH resources may not be available for all UEs that are in an RRC Connected state, so that some RRC connected UEs may be not UL synchronized.

A UL synchronized UE may lose UL synchronization when the system/RAN stops maintaining its UL time alignment. If that happens, the system/RAN may release any semi-static PUCCH resources (SR, CQI) that it may have for the UE so that the UE transitions from UL synchronized to Not UL synchronized.

For a heavily loaded system/RAN, it may be beneficial to have only a subset of the RRC Connected UEs in the UL synchronized state in a cell, so that an increased number of UEs can be RRC Connected without increasing semi-static PUCCH resources during peak load scenarios.

Maintaining a UE in a not UL synchronized state, however, may increase latency for data transactions for UEs in the not UL synchronized state. When a data transaction is needed, the not UL synchronized UE may first be required to regain UL resynchronization. The UE initiates re-synchronization using a random access procedure, before it can send any UL data. Moreover, if the network needs to send data or control information to the UE, the network may need to force the UE to synchronize in order to receive the required response.

In addition, a UE in a not UL synchronized state may lack immediate resources for uplink data transmission. A UE which has regained UL synchronization may not yet have been assigned PUCCH resources, and instead, the UE may be expected to send a buffer status report (using a minimal UL grant received at content resolution) before such PUCCH resources are assigned.

Because a not UL synchronized UE may need to use a random access procedure to regain UL synchronization and to then send a buffer status report before PUCCH resources are assigned, user plane latency for the UE may be increased, and reductions in such delay/latency may be desired.

Triggers for current methods to configure PUCCH resources using RRC may be relatively slow, delaying initiation of UL synchronization and configuring of PUCCH resources. As a result, a UE may be without D-SR resources for a significant number of Transmission Time Intervals (TTIs) after UL re-synchronization, and the UE may be required to continue using RA-SRs (Random Access Scheduling Requests) to request UL data transmission resources. Accordingly, user plane latency and load on random access resources may be further increased.

A delay until a UE can use D-SR may depend on network load and implementation, and also on UE implementation, and the delay may typically vary between 13 and 50 ms. This is a relatively long time that leaves open the possibility that the UE will again trigger the same contention based procedure for random access to request resources. The RA-SR using contention based random access (CBRA) may require more time than the D-SR. Depending again on the load and other contending/competing UEs, scheduling using CBRA may take twice as long as scheduling using a D-SR with dedicated PUCCH resources. In addition, RA-SR may require more overhead signaling.

Not UL synchronized UEs may thus be subject to increased latency due to the time needed for re-synchronization and/or due to a lack of D-SR resources immediately available after re-synchronization.

SUMMARY

According to some embodiments of inventive concepts, a method of operating a base station of a radio access network (RAN) may include transmitting a Medium Access Control (MAC) message from the node of the RAN to a wireless terminal. The MAC message may include a Control Element (CE) defining an assignment of resources for dedicated scheduling requests (D-SRs) available for the wireless terminal to transmit dedicated scheduling requests to the node.

By defining an assignment of resources for dedicated scheduling requests in a MAC message control element, such resources for dedicated scheduling requests may be more quickly assigned, and reliance on less efficient random access scheduling requests may be reduced. Accordingly, allocation of limited resources for dedicated scheduling requests among wireless terminals may be improved, use of random access scheduling requests may be reduced, and/or system capacity may be increased.

The CE element may include a code frequency domain index field with a code frequency domain index identifying one of a plurality of code frequency domain resources available for the wireless terminal to transmit dedicated scheduling requests and a time domain index field with a time domain index identifying one of a plurality of time domain resources available for the wireless terminal to transmit dedicated scheduling requests.

For example, the time domain index field may be a first time domain index field, the time domain index may be a first time domain index, the plurality of time domain resources may be a first plurality of time domain resources, and the assignment of resources may be a first assignment of resources for dedicated scheduling requests available for the wireless terminal. After transmitting the MAC message, a Radio Resource Control (RRC) message may be transmitted from the node of the RAN to the wireless terminal (UE). The RRC message may include a second time domain index field larger than the first time domain index field with a second time domain index identifying one of a second plurality of time domain resources available for the wireless terminal to transmit dedicated scheduling requests. More particularly, the first plurality of time domain resources may be different than the second plurality of time domain resources.

The first plurality of time domain resources may be a subset of the second plurality of time domain resources, or the first plurality of time domain resources and the second plurality of time domain resources may be mutually exclusive.

The code frequency domain index field may be a first code frequency domain index field, the code frequency domain index may be a first code frequency domain index, and the plurality of code frequency domain resources may be a first plurality of code frequency domain resources. The RRC message may include a second code frequency domain index field larger than the first code frequency domain index field with a second code frequency domain index identifying one of a second plurality of code frequency domain resources available for the wireless terminal to transmit dedicated scheduling requests. More particularly, the first plurality of code frequency domain resources may be different than the second plurality of code frequency domain resources.

The MAC message may be a first MAC message, the Control Element may be a first Control Element, and the first Control Element may include a D-SR message type identifier and an Assign/Revoke field having a first Assign/Revoke value. Responsive to determining to revoke the assignment of resources for dedicated scheduling requests, a second MAC message may be transmitted to the wireless terminal with the second MAC message including a second Control Element (CE) including the D-SR message type identifier and an Assign/Revoke field having a second Assign/Revoke value different than the first Assign/Revoke value.

Before transmitting the MAC message, a PDCCH order may be transmitted to the wireless terminal to initiate a downlink data transmission of downlink data. A response to the PDCCH order may be received from the wireless terminal. Responsive to receiving the response, a downlink assignment may be transmitted to the wireless terminal. The MAC message may be transmitted in accordance with the downlink assignment, and the downlink data may be multiplexed with the Control Element in the MAC message.

Before transmitting the MAC message, a contention based random access (CBRA) preamble may be received from the wireless terminal. Responsive to receiving the CBRA preamble, a downlink assignment may be transmitted to the wireless terminal, and the MAC message may be transmitted in accordance with the downlink assignment to the wireless terminal.

The assignment of resources may define a time domain for the resources available for the wireless terminal to transmit dedicated scheduling requests, and the time domain may be defined based on a subframe time offset and a time periodicity.

After transmitting the MAC CE message including the assignment of resources, a dedicated scheduling request may be received from the wireless terminal over a Physical Uplink Control Channel (PUCCH) using one of the resources defined according to the subframe time offset and the time periodicity. Responsive to receiving the dedicated scheduling request over the PUCCH, an uplink scheduling assignment may be transmitted to the wireless terminal for a Physical Uplink Shared Channel (PUSCH). After transmitting the uplink scheduling assignment, uplink data may be received from the wireless terminal over the PUSCH in accordance with the uplink scheduling assignment.

According to some other embodiments of inventive concepts, a base station of a radio access network (RAN) may include a transceiver configured to provide radio communications with a plurality of wireless terminals, and a processor coupled to the transceiver. More particularly, the processor may be configured to transmit a Medium Access Control (MAC) message through the transceiver to a wireless terminal, and the MAC message may include a Control Element (CE) defining an assignment of resources for dedicated scheduling requests (D-SRs) available for the wireless terminal to transmit dedicated scheduling requests to the node.

According to still other embodiments of inventive concepts, a base station of a radio access network (RAN) may be adapted to transmit a Medium Access Control (MAC) message to a wireless terminal (UE). Moreover, the MAC message may include a Control Element (CE) defining an assignment of resources for dedicated scheduling requests (D-SRs) available for the wireless terminal to transmit dedicated scheduling requests to the node.

According to yet other embodiments, of inventive concepts, a method of operating a wireless terminal in a radio access network (RAN) may include receiving a Medium Access Control (MAC) message from a node of the RAN. The MAC message includes a Control Element (CE) defining an assignment of resources for dedicated scheduling requests (D-SRs) available for the wireless terminal (UE) to transmit dedicated scheduling requests to the node.

The CE may include a code frequency domain index field with a code frequency domain index identifying one of a plurality of code frequency domain resources available for the wireless terminal to transmit dedicated scheduling requests and a time domain index field with a time domain index identifying one of a plurality of time domain resources available for the wireless terminal to transmit dedicated scheduling requests.

The time domain index field may be a first time domain index field, the time domain index may be a first time domain index, the plurality of time domain resources may be a first plurality of time domain resources, and the assignment of resources may be a first assignment of resources for dedicated scheduling requests available for the wireless terminal. After receiving the MAC message, a Radio Resource Control (RRC) message may be received from the node of the RAN. The RRC message may include a second time domain index field larger than the first time domain index field with a second time domain index identifying one of a second plurality of time domain resources available for the wireless terminal to transmit dedicated scheduling requests. Moreover, the first plurality of time domain resources may be different than the second plurality of time domain resources. For example, the first plurality of time domain resources may be a subset of the second plurality of time domain resources, or the first plurality of time domain resources and the second plurality of time domain resources may be mutually exclusive.

The code frequency domain index field may be a first code frequency domain index field, the code frequency domain index may be a first code frequency domain index, and the plurality of code frequency domain resources may be a first plurality of code frequency domain resources. The RRC message may include a second code frequency domain index field larger than the first code frequency domain index field with a second code frequency domain index identifying one of a second plurality of code frequency domain resources available for the wireless terminal to transmit dedicated scheduling requests. Moreover, the first plurality of code frequency domain resources may be different than the second plurality of code frequency domain resources.

The MAC message may be a first MAC message, the Control Element may be a first Control Element, and the first Control Element may include a D-SR message type identifier and an Assign/Revoke field having a first Assign/Revoke value. After receiving the first MAC message, a second MAC message may be received from the node of the radio access network with the second MAC message including a second Control Element (CE) including the D-SR message type identifier and an Assign/Revoke field having a second Assign/Revoke value different than the first Assign/Revoke value. After receiving the second MAC message including the Assign/Revoke field with the second Assign/Revoke value, a random access scheduling request may be transmitted to the node of the radio access network responsive to determining that uplink data is available for transmission.

Before receiving the MAC message, an order may be received from the node of the RAN to initiate a downlink data transmission of downlink data. After receiving the order, a downlink assignment may be received from the node of the RAN, and the MAC message may be received in accordance with the downlink assignment with the downlink data being multiplexed with the Control Element in the MAC message.

Before receiving the MAC message, a contention based random access (CBRA) preamble may be transmitted to the node of the radio access network responsive to determining that uplink data is available for an uplink data transmission. After transmitting the CBRA preamble, a downlink assignment may be received from the node of the radio access network, with the MAC message being received in accordance with the downlink assignment.

The assignment of resources may define a time domain for the resources available for the wireless terminal to transmit dedicated scheduling requests, and the time domain may be defined based on a subframe time offset and a time periodicity.

After receiving the MAC CE message including the assignment of resources, a dedicated scheduling request may be transmitted over a Physical Uplink Control Channel (PUCCH) using one of the resources defined according to the subframe time offset and the time periodicity. After transmitting the dedicated scheduling request over the PUCCH, an uplink scheduling assignment may be received for a Physical Uplink Shared Channel (PUSCH). After receiving the uplink scheduling assignment, uplink data may be transmitted from the wireless terminal over the PUSCH in accordance with the uplink scheduling assignment.

According to more embodiments of inventive concepts, a wireless terminal may operate in a radio access network (RAN). The wireless terminal may include a transceiver configured to provide radio communications with a node of the radio access network, and a processor coupled to the transceiver. The processor may be configured to receive a Medium Access Control (MAC) message through the transceiver from the node of the radio access network. The MAC message may include a Control Element (CE) defining an assignment of resources for dedicated scheduling requests (D-SRs) available for the wireless terminal to transmit dedicated scheduling requests to the node.

According to still more embodiments of inventive concepts, a wireless terminal may operate in a radio access network (RAN), and the wireless terminal may be adapted to receive a Medium Access Control (MAC) message from a node of the radio access network. The MAC message may include a Control Element (CE) defining an assignment of resources for dedicated scheduling requests (D-SRs) available for the wireless terminal (UE) to transmit dedicated scheduling requests to the node.

BRIEF DESCRIPTION OF THE DRAWINGS

The accompanying drawings, which are included to provide a further understanding of the disclosure and are incorporated herein and constitute a part of this application, illustrate certain non-limiting embodiments of inventive concepts. In the drawings:

FIG. 1 is a block diagram illustrating procedures and channels involved in D-SR and RA-SR communications between a base station and a user equipment node in an LTE uplink;

FIG. 2 is an information format illustrating elements of a SchedulingRequestConfig information element used to define resources for D-SR;

FIG. 3 is a block diagram illustrating processing of a SchedulingRequestConfig information element using RRC (Radio Resource Control) and PHY (Physical Layer);

FIGS. 6-9 are diagrams illustrating structures of D-SR assignment messages according to some embodiments of inventive concepts;

FIG. 10 is a table illustrating UE specific periodicity and subframe offset configurations for D-SR that may be used according to some embodiments of inventive concepts;

FIG. 11 is a diagram illustrating a structure of a D-SR message according to some embodiments of inventive concepts;

FIG. 12 is a diagram illustrating transmission of a PUCCH dedicated scheduling request D-SR according to some embodiments of inventive concepts;

FIGS. 18A-C and 19 are flow charts illustrating base station operations according to some embodiments of inventive concepts;

FIGS. 20A-C and 21 are flow charts illustrating wireless terminal operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless devices. It will be understood, however, that inventive concepts are not limited to such embodiments and may be embodied generally in any type of communication network. As used herein, a wireless terminal (also referred to as a UE, user equipment node, mobile device, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M (machine-to-machine) device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned systems. Other wireless systems, including WCDMA, WiMax, UMB, and/or GSM, may also benefit from exploiting ideas/concepts covered within this disclosure.

Also, note that terminology such as base station (also referred to as an eNodeB, eNB, etc.) and wireless terminal (also referred to as a UE, user equipment node, mobile device, mobile terminal, wireless device, etc.) should be considering non-limiting.

Figure 15A:
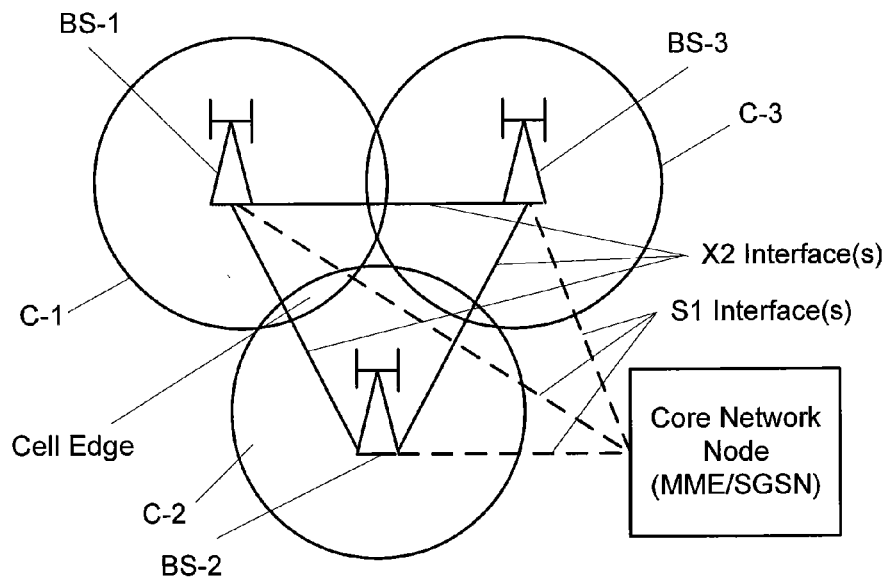
FIGS. 15A and 15B are respective schematic and block diagrams illustrating network architectures according to some embodiments of inventive concepts.

FIG. 15A is a schematic diagram illustrating an LTE architecture of base stations (e.g., eNBs) BS-1, BS-2, and BS-2 of a Radio Access Network RAN (E-UTRAN) and a core network node MME/S-GW according to some embodiments of inventive concepts. As shown, each base station may provide service over a respective cell C-1, C-2, and C-3, and communications between base stations may be provided over a respective interface(s), such as an X2 interface(s), illustrated with solid lines. Moreover, communications between the core network node and respective base stations may be provided over a respective interface, such as an S1 interface(s), illustrated with dashed lines.

Figure 15B:
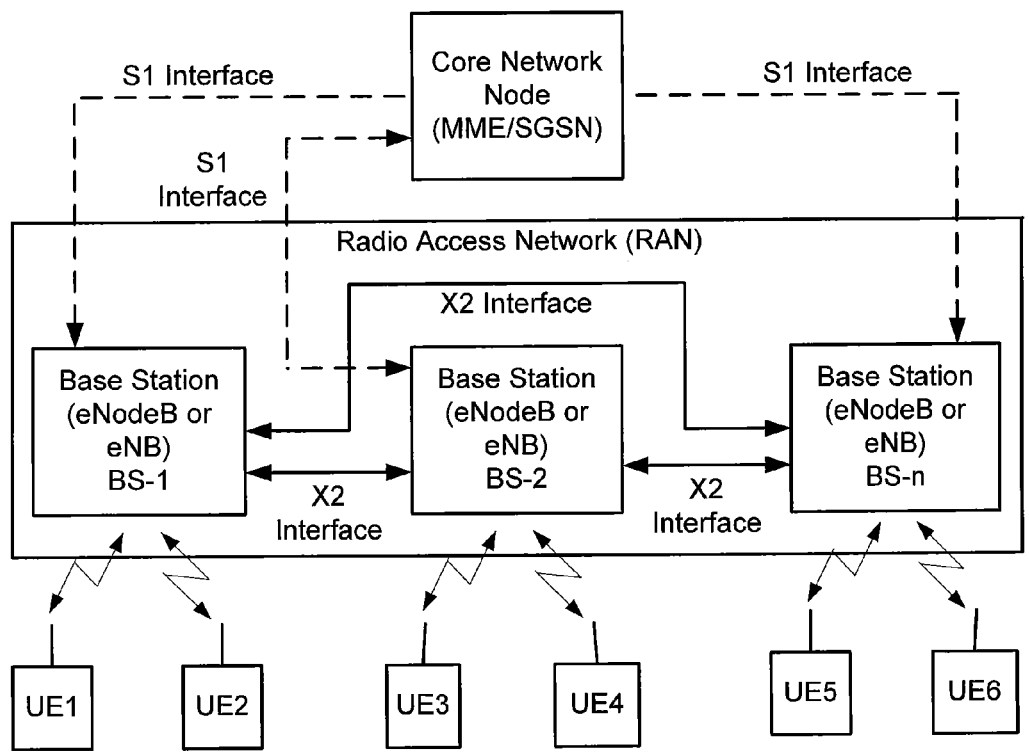

FIG. 15B is a block diagram further illustrating the LTE architecture of FIG. 15A according to some embodiments of present inventive concepts. As shown, communications between base stations and one or more core network nodes (e.g., Mobility Management Entity MME or Service GPRS Support Node SGSN) may be provided using respective S1 interfaces, and communications between base stations may be provided using respective X2 interfaces. Each base station BS may communicate over a radio interface (including uplinks and downlinks) with respective wireless terminals UEs in a respective cell or cells supported by the base station (shown in FIG. 15A). By way of example, base station BS-1 is shown in communication with wireless terminals UE-1 and UE-2, base station BS-2 is shown in communication with wireless terminals UE-3 and UE-4, and base station BS-3 is shown in communication with wireless terminals UE-5 and UE-6.

Figure 16:
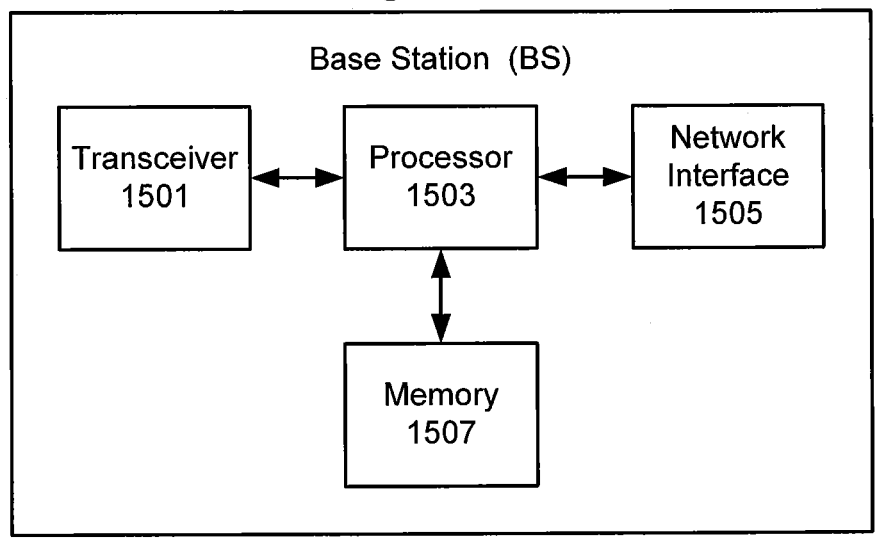
FIG. 16 is a block diagram illustrating a base station according to some embodiments of FIGS. 15A and 15B.

FIG. 16 is a block diagram illustrating elements of a base station BS of FIGS. 15A and 15B. As shown, a base station BS may include a transceiver circuit 1501 (also referred to as a transceiver or radio interface) configured to provide radio communications with a plurality of wireless devices, a network interface circuit 1505 (also referred to as a network interface) configured to provide communications with other base stations of the RAN (e.g., over the X2 interface), and a processor circuit 1503 (also referred to as a processor) coupled to the transceiver circuit and the network interface circuit, and a memory circuit 1507 coupled to the processor circuit. The memory circuit 1507 may include computer readable program code that when executed by the processor circuit 1503 causes the processor circuit to perform operations according to embodiments disclosed herein. According to other embodiments, processor circuit 1503 may be defined to include memory so that a memory circuit is not separately provided. Each of base stations BS-1, BS-2, and BS-3 may be separately implemented according to the structure of FIG. 15. Moreover, processor circuit 1503 may be configured to perform UL reception processing (e.g., including baseband processing, demodulation, and/or decoding) and/or UL CoMP reception processing (e.g., including joint baseband processing using IQ data from both serving and cooperating base stations, joint demodulation/decoding using soft information bits from both serving and cooperating base stations, and/or joint decoding using coded information bits from both serving and cooperating base stations).

Figure 17:
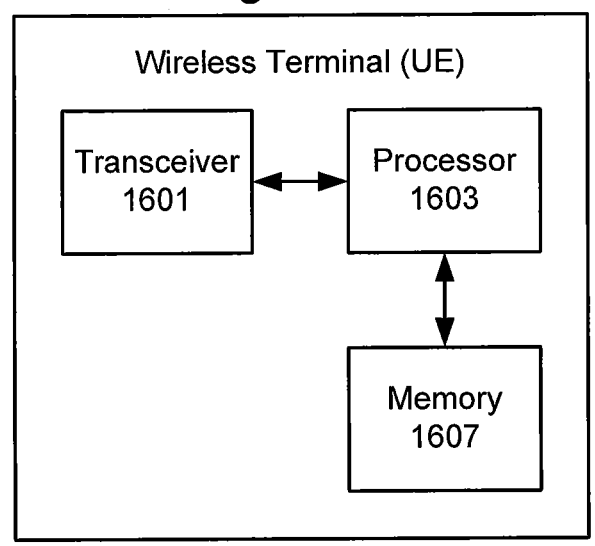
FIG. 17 is a block diagram illustrating a wireless terminal according to some embodiments of FIGS. 15A and 15B.

FIG. 17 is a block diagram illustrating elements of a wireless terminal UE of FIGS. 15A and 15B. As shown, a wireless device UE may include a transceiver circuit 1601 (also referred to as a transceiver) including a transmitter and a receiver configured to provide radio communications with a base station BS, a processor circuit 1603 (also referred to as a processor) coupled to the transceiver circuit, and a memory circuit 1607 coupled to the processor circuit. The memory circuit 1607 may include computer readable program code that when executed by the processor circuit 1603 causes the processor circuit to perform operations according to embodiments disclosed herein. According to other embodiments, processor circuit 1603 may be defined to include memory so that a memory circuit is not separately provided.

According to some embodiments of inventive concepts, Medium Access Control (MAC) messages may be used to assign fast resources for D-SR. Some UE vendors may have agreements with eNB vendors to extend the MAC Control layer, and such extensions may be used to define new MAC control procedures.

According to some embodiments of inventive concepts, inactive UEs may be forced to make a transition to Not UL synchronized state to allow for higher capacity. For example, D-SR resources used for fast scheduling can thus be used for other more active UEs that have greater need for such resources.

By only keeping active UEs in a UL synchronized state, overall utilization of PUCCH (Physical Uplink Control Channel) resources may be increased. A system that keeps only 50% of the UEs in a UL synchronized state can support twice as many RRC Connected UEs with a same amount of semi-static PUCCH resources as compared with a situation where all UEs are kept UL synchronized. Unless pre-scheduling grants or new PUCCH resources can be provided promptly, the UEs may repeat/reiterate random access requests when they are in urgent need to resynchronize and send data. Such inefficient use of random access requests may increase user plane latency and/or reduce system capacity.

The network may have control over the UL synchronization state of a particular UE. According to some embodiments of inventive concepts, a network may be able to more promptly provide PUCCH resources to a UE that has regained UL synchronization. According to some embodiments, a network operator may separate RRC UEs into either of two categories, UEs that are UL synchronized and UEs that are not UL synchronized. UEs that are UL synchronized may be assigned fast dedicated resources to transmit UL data or at least to send scheduling requests to transmit data. UEs that are not UL synchronized do not have such assigned dedicated resources to send UL data or to schedule requests to send UL data, but improved methods to regain such resources may be provided. By defining control procedures for Medium Access Control (MAC) operations, a speed of assignment of resources may be increased relative to Radio Resource Control (RRC) operations.

Some UE vendors may have agreements with eNB vendors to extend the MAC Control layer to allow definition of new MAC control procedures. MAC control procedures described herein may provide rapid/immediate information responsive to a UE regarding scheduling request (SR) resources on the PUCCH, and this information may identify which PUCCH resources shall be used for SR transmission.

According to some embodiments of inventive concepts, a UE may initially be in an RRC connected state and not uplink synchronized (i.e., a time alignment timer for the UE is not running, and D-SR resources are not assigned to the UE). The UE may then initiate establishing or re-establishing its uplink synchronization, for example, using a random access procedure. The base station may use the MAC layer of the radio access network to transmit a D-SR (scheduling request SR transmitted over PUCCH) configuration in an early transmission to the UE after the RA (random access) procedure.

According to some other embodiments of inventive concepts, the D-SR configuration may be transmitted using a MAC control message. FIGS. 6-9 and 11 illustrate structures of such D-SR Dedicated Scheduling Request messages according to some embodiments of inventive concepts. The D-SR message of FIGS. 6, 7, 9, and 11 may use 4 bits for Index-2 to address a fastest portion of the value space for the D-SR configuration index (e.g., corresponding to indices 0-12 and 155-157 out of the total range of indices 0-157 as used by the RRC IE sr-ConfigIndex of FIG. 4) as shown in FIG. 10. For example, a four bit field (with 16 possible values) for Index-2 may be used to identify/select one of: the D-SR assignment of SR configuration index 157 from FIG. 10 with a periodicity of 1 ms; one of D-SR assignments of SR configuration indices 155-156 from FIG. 10 with a periodicity of 2 ms; one of D-SR assignments of SR configuration indices 0-4 from FIG. 10 with a periodicity of 5 ms; or one of D-SR assignments of SR configuration indices 5-12 of FIG. 10 with a periodicity of 10 ms. By way of example, values of Index-2 of FIGS. 6, 7, 9, and 11 may map to SR configuration indices of FIG. 10 as indicated below in Table 1.

TABLE 1

Mappings Between Index-2 and SR configuration index.

Figures 4, 5:
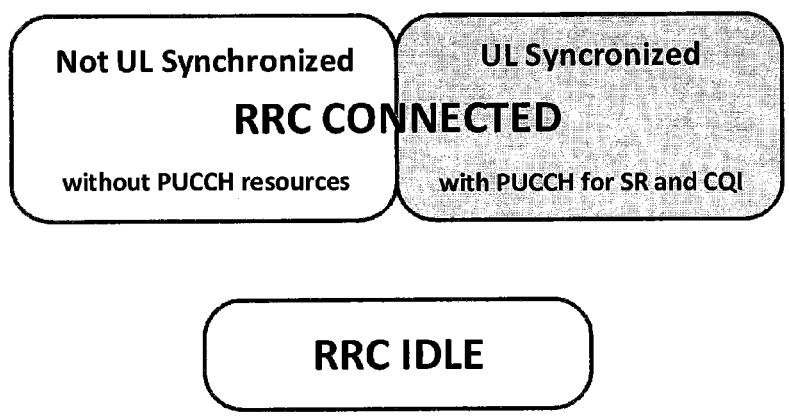
FIG. 4 is a table illustrating UE specific periodicities and subframe offset configurations for D-SR.
FIG. 5 is a diagram illustrating RRC states of a wireless terminal.

| Index-2 of FIGS. 6-9 | | SR Config. Index of FIG. 4 | | Index-2 of FIGS. 6-9 | | SR Config. Index of FIG. 4 | |
|---|---|---|---|---|---|---|---|
| 0000 | (0) | 00000101 | (5) | 1000 | (8) | 00000000 | (0) |
| 0001 | (1) | 00000110 | (6) | 1001 | (9) | 00000001 | (1) |
| 0010 | (2) | 00000111 | (7) | 1010 | (10) | 00000010 | (2) |
| 0011 | (3) | 00001000 | (8) | 1011 | (11) | 00000011 | (3) |
| 0100 | (4) | 00001001 | (9) | 1100 | (12) | 00000100 | (4) |
| 0101 | (5) | 00001010 | (10) | 1101 | (13) | 10011011 | (155) |
| 0110 | (6) | 00001011 | (11) | 1110 | (14) | 10011100 | (156) |
| 0111 | (7) | 00001100 | (12) | 1111 | (15) | 10011101 | (157) |

Accordingly, the four bit Index-2 field of FIGS. 6-9 may only be used to identify a subset of the SR configurations of FIG. 4. According to embodiments illustrated above in Table 1, the 4 bit reduced index may be organized so that the first 8 index values 0-7 map to the SR configurations having 10 ms periodicities, and so that the last 8 index values 8-15 map to the faster SR configurations having 1 ms, 2 ms, or 5 ms periodicities.

The MAC CE message of FIG. 6 may thus use an 11 bit field for Index-1 (for code frequency domain allocation) to address the full value space of the Resource Index (with a range 0 . . . 2027 used by RRC IE sr-PUCCH-ResourceIndex and sr-PUCCH-ResourceIndexP1-r10). The MAC CE message in FIG. 7 may instead use 8 bits (for code frequency domain allocation) to address a smaller but dedicated part (or subset) of the value space. With fewer bits used for Index-1, a message type MT=DEDSR may be provided in one of the two octets used to transmit Index-2 and Index-1 as shown in FIGS. 7-9 and 11.

The message in FIG. 6 does not include a message type discriminator but may instead assume additional protocol rules to discriminate/identify the message as a D-SR message (e.g., a specific LCID value). The message in FIG. 7 may instead use an explicit message type where a certain MT (message type) value (e.g., "010") is used to identify the DEDSR message. In the example structures of FIGS. 6 and 7, additional protocol rules may be used to discriminate when to revoke a resource that has been assigned. This can be done, for example, using a maximum occupation timer, so that the UE implicitly releases the resource when the maximum occupation timer expires. For example, the UE may initiate a D-SR occupation timer when a D-SR resource is assigned, and the occupation timer may be reinitiated each time a D-SR is transmitted to the base station using PUCCH. If the occupation timer expires before transmission of a next D-SR (e.g., due to a lack of traffic), the UE may release the assigned D-SR resource(s). The base station may operate a similar occupation timer for the UE so that both the UE and the base station will know when a D-SR resource for the UE has been released so that the base station can assign that D-SR resource to another UE.

According to some other embodiments illustrated in FIG. 8, an explicit A/R bit may be used to control assignment and/or revocation of a D-SR resource for a UE. In this embodiment, the message body (indicated as NN) of the D-SR message may depend on the value of the A/R bit. For example, neither INDEX 1 nor INDEX 2 may need to be provided to revoke an assigned D-SR resource (provided that the UE is assigned only one D-SR resource at a time). More particularly, a first value of the A/R bit (e.g., "1") may indicate an assignment of a D-SR resource as defined by Index-1 and Index-2 values included in the protocol message body (e.g., as discussed above with respect to FIG. 7), and a second value of the A/R (Assign/Revoke) bit (e.g., "0") may indicate a revocation of a previously assigned D-SR resource. If only one D-SR resource has been previously assigned to the UE before the revocation, the Index-1 and Index-2 values defining the D-SR resource may be omitted from the revocation message, and the 12 bit PMB (protocol message body) field (indicated as NN in FIG. 8) may be used for other purposes.

Figure 9:
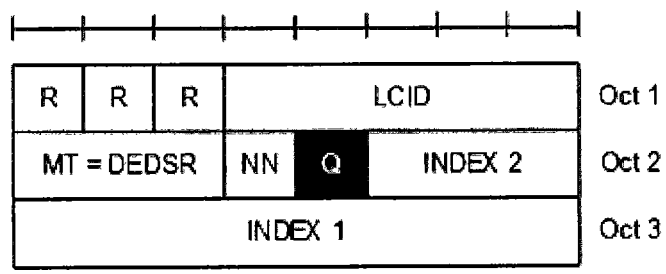

According to some other embodiments illustrated in FIG. 9, a four bit field for Index 2 may include one bit Q to discriminate between 2 sets of eight value points for the SR configuration index identified using a 3 bit field for Index 2. Using the Index-2 and SR configuration index mappings of Table 1 above, for example, the first bit (on the left) of Index-2 may be interpreted as the bit Q, and the last three bits (on the right) may be interpreted as the three bit Index 2. Where the first bit of Index 2 is zero (i.e., for Index 2 values of 0-7), one of SR configuration indices 5-12 (having a periodicity of 10 ms) may be identified. Where the first bit of Index 2 is one (i.e., for Index 2 values of 8-15), one of SR configuration indices 0-4 (having a periodicity of 5 ms), SR configuration indices 155-156 (having a periodicity of 2 ms), or SR configuration index 157 (having a periodicity of 1 ms) may be identified.

The table of FIG. 10 illustrates UE-specific periodicity and subframe offset configurations according to some embodiments.

According to some other embodiments illustrated in FIG. 11, the MAC CE message may include a discriminator PB that may allow the UE to use the assigned D-SR resources immediately by piggy-backing and multiplexing a D-SR already on the next HARQ-ACK response. A format for such a PB UL transmission, for example, may be provided using a PUCCH Format 3 as set forth in subclause 5.2.3.1 of 3GPP TS 36.212 V12.4.0 (2015-03).

Figure 13:
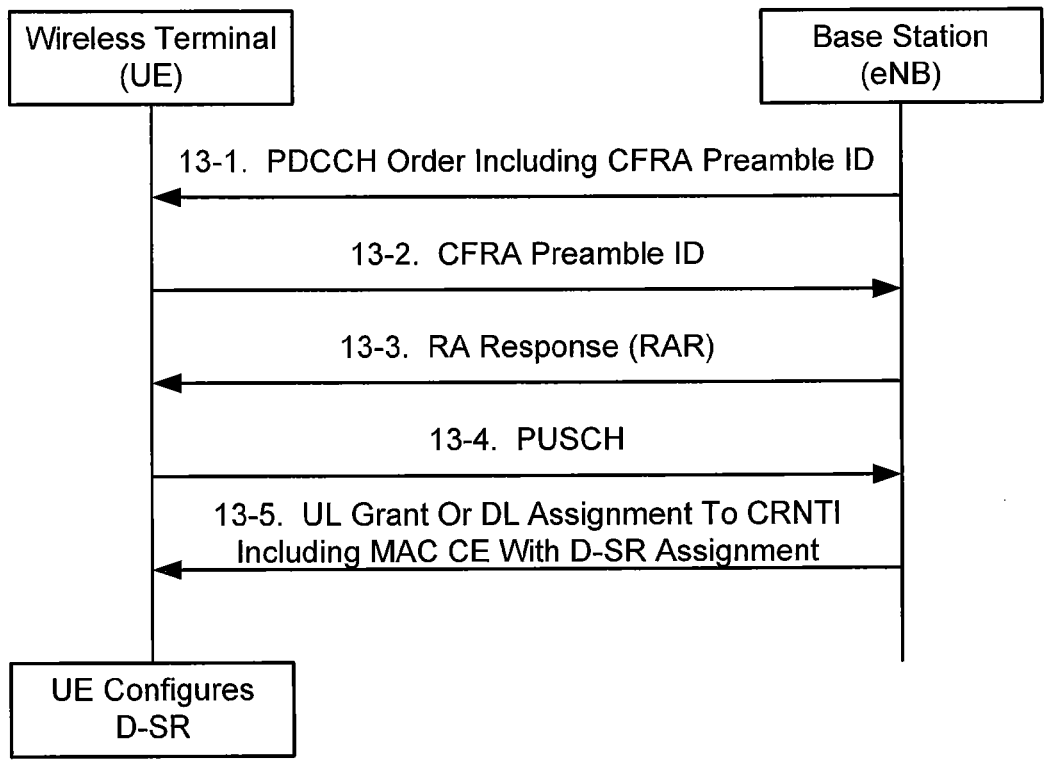
FIG. 13 is a message diagram illustrating a contention free random access procedure including a D-SR assignment according to some embodiments of inventive concepts.

According to some other embodiments of inventive concepts, PUCCH resource provisioning may be coupled to a re-synchronization provided using a Contention Free Random Access (CFRA) procedure as shown in FIG. 13. The MAC message may be included in a DL transmission (operation 13-5) which is transmitted as soon as possible, such as at n+2 TTI where n is the Transmission Time Interval TTI (or subframe) where the random access response RAR (operation 13-3) was transmitted to the UE (where the UE receives Time Alignment Command TAC with the RAR). Subframe n+2 may be selected due to the HARQ (Hybrid Automatic Repeat reQuest) RTT (Round Trip Time) of LTE FDD (Frequency Division Duplex), which is 4 ms, and because it may take 6 ms before a standard UE can be considered UL synchronized. Extended capabilities may allow for even faster provisioning such as in subframe n+1 or even subframe n.

As shown in FIG. 13, a contention free random access (CFRA) procedure may be initiated by the base station transmitting a PDCCH Order including a CFRA Preamble ID to the wireless terminal at operation 13-1. At operation 13-2, the wireless terminal may respond by transmitting the CFRA Preamble ID to the base station. Responsive to receiving the CFRA Preamble ID, the base station may transmit a Random Access Response RAR and a Time Alignment Command TAC at operation 13-3. At operation 13-4, the wireless terminal may transmit uplink data using the physical uplink shared channel PUSCH based on the RA response, and at operation 13-5, the base station may transmit a UL grant or DL assignment to the CRNTI (Cell Radio Network Temporary Identifier) of the wireless terminal and including a MAC CE with the D-SR assignment (e.g., as discussed above with respect to FIGS. 6, 7, and 8).

When UL re-synchronization is initiated/triggered by the base station (eNB) using CFRA as shown in FIG. 13, the base station (eNB) includes the MAC CE that specifies the D-SR resources to be used by the UE in the grant or downlink assignment transmitted to the CRNTI of the wireless terminal (UE) at operation 13-5. The wireless terminal (UE) then uses the MAC CE to configure the D-SR resources.

Figure 14:
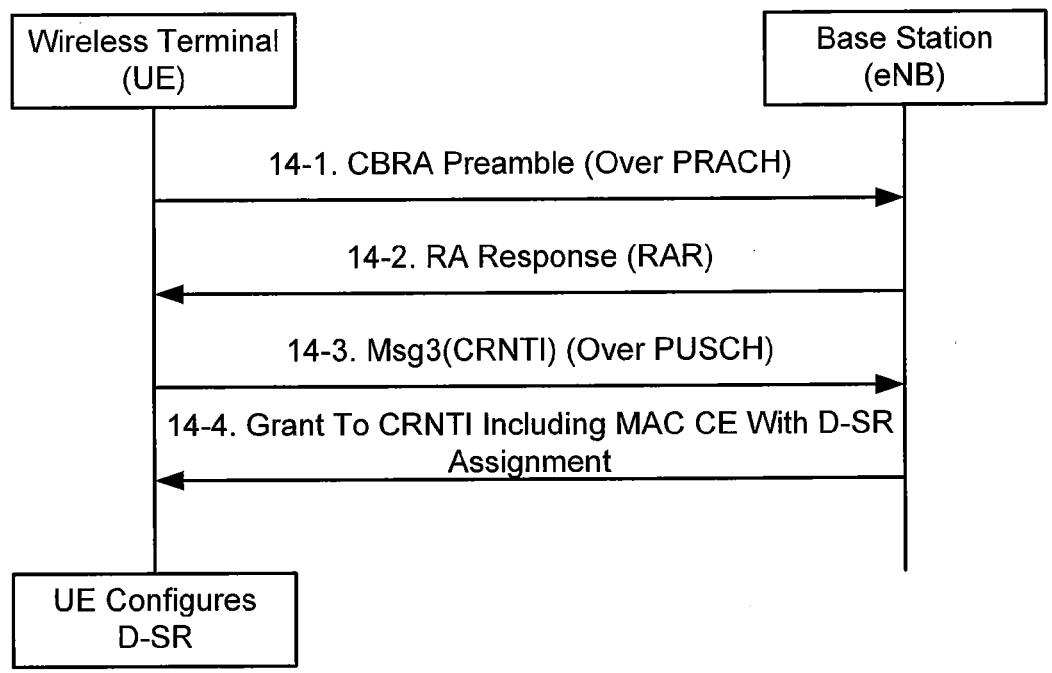
FIG. 14 is a message diagram illustrating a contention based random access procedure including a D-SR assignment according to some embodiments of inventive concepts.

According to still other embodiments, PUCCH provisioning may be coupled to a Contention Based Random Access CBRA procedure as shown in FIG. 14. The MAC message with the D-SR assignment may be included in a first DL transmission at operation 14-4 after the Msg3 message including the CRNTI for the wireless terminal, or in close proximity of that transmission. The first transmission may also be the transmission that is used to perform contention resolution CR.

As shown in FIG. 14, the wireless terminal may initiate the CBRA procedure by transmitting a contention based random access CBRA preamble at operation 14-1. Responsive to receiving the CBRA preamble, the base station may transmit a Random Access Response RAR at operation 14-2. At operation 14-3, the wireless terminal may then transmit a Msg3 message including the CRNTI, and the base station may transmit a grant to the CRNTI of the wireless terminal including the MAC CE with the D-SR assignment.

When UL re-synchronization is triggered by the UE using CBRA as shown in FIG. 14, the base station (eNB) includes the MAC CE that specifies the D-SR resources to be used by the wireless terminal (UE) in the grant transmitted (at operation 14-4) to the CRNTI of the wireless terminal that was received in the msg3 message (at operation 14-3). The UE uses the MAC CE to configure the SR resources.

According to still other embodiments of inventive concepts, the UE may use the assigned D-SR resource(s) more quickly/immediately by piggy-backing a scheduling request SR on the HARQ-ACK by using a PUCCH Format 3 (where the SR is multiplexed with HARQ-ACK according to subclause 5.2.3.1 of 3GPP TS 36.212) as shown in FIG. 11 where a discriminator PB is provided for PUCCH Format 3. Using the format of FIG. 11, the UE may be able to use the resource more quickly/immediately when providing the HARQ Acknowledgement for the MAC PDU which includes the D-SR message.

FIG. 12 illustrates transmission of a PUCCH scheduling request SR (indicated with a solid line) from a wireless terminal UE (L2 receiver) to a base station (L2 transmitter) with control information indicated with dashed lines.

With UL re-synchronization using RRC, a wireless terminal may re-gain UL synchronization without D-SR resources and may not be able to use D-SR resources until such resources are configured using a later RRC Reconfiguration. While RRC may be relatively accurate and safe, RRC may be relatively slow. UL re-synchronization may always be triggered by a need for data transmission, either uplink or downlink. It may therefore be useful to obtain/provide D-SR resources as soon as possible after UL re-synchronization to reduce UE latency.

Efficient UL re-synchronization and D-SR assignment may be especially important in high load cases because UL re-synchronization and D-SR assignment may allow more efficient use of PUCCH resources. In high load scenarios, for example, UE random access may be inefficient because the UE may have to use multiple RA requests to request resources, requiring more signaling than may be required to use D-SR resources (e.g., because RA may require multiple attempts). D-SR assignment according to some embodiments of inventive concepts may thus reduce system load.

FIGS. 18A-C and 19 are flow charts illustrating operations of base station BS of FIGS. 15A-B and 16 according to some embodiments of inventive concepts.

FIG. 18A is a flow chart illustrating base station operations assigning resources for D-SR using contention free random access procedures as discussed above with respect to FIG. 13. Operations of FIG. 18A may be initiated by base station processor 1503 at block 1721 in response to buffering of data for downlink transmission from base station BS to wireless terminal UE. At block 1721, base station processor 1503 may wait until there is data for downlink DL transmission to the wireless terminal UE, and responsive to buffering of such data at block 1721, processor 1503 may transmit a PDCCH (physical downlink control channel) order (including a dedicated Preamble, e.g., different than "000000") through transceiver 1501 to wireless terminal at block 1722 using a C-RNTI identification for wireless terminal UE as discussed above with respect to operation 13-1 of FIG. 13. Once a response is received from wireless terminal UE (including the dedicated CFRA preamble) through transceiver 1501 at block 1723 as discussed above with respect to operation 13-2, processor 1503 may transmit a random access response through transceiver 1501 to wireless terminal UE at block 1725 as discussed above with respect to operation 13-3.

At block 1726, processor 1503 may transmit a DownLink DL assignment over the physical downlink control channel PDCCH. At block 1727, processor 1503 may transmit a Medium Access Control (MAC) message through transceiver 1501 to wireless terminal UE using the physical downlink shared channel PDSCH in accordance with the DL assignment of block 1726 as discussed above with respect to operation 13-5 of FIG. 13. The MAC message of block 1727 may include a Control Element CE defining an assignment of resources for dedicated scheduling requests D-SRs available for the wireless terminal UE to transmit dedicated scheduling requests to the node. At block 1729, processor 1501 may transmit the buffered downlink data through transceiver 1501 to wireless terminal UE in accordance with the downlink assignment. According to some embodiments, processor 1503 may perform operations of blocks 1727 and 1729 by multiplexing the control element CE of block 1727 and the DL data of block 1729 in a same MAC message. According to some other embodiments, processor 1503 may transmit separate DL assignments at block 1726 (e.g., at different times) for the D-SR resources of block 1727 and for the DL data of block 1729 so that the D-SR resources of block 1727 and the DL data of block 1729 may be transmitted via different MAC messages and/or at different times.

FIG. 18B is a flow chart illustrating base station operations assigning resources for D-SR using contention based random access procedures as discussed above with respect to FIG. 14. Operations of FIG. 18B may be initiated by wireless terminal UE at block 1741 in response to buffering of data for uplink transmission from wireless terminal UE to base station BS. At block 1741, base station processor 1503 may wait to receive a contention based random access CBRA preamble over a random access channel (e.g., Physical Random Access Channel PRACH). Once such a CBRA preamble is received from wireless terminal UE through transceiver 1501 at block 1741 as discussed above with respect to operation 14-1, processor 1503 may transmit a random access response through transceiver 1501 to wireless terminal UE at block 1743 as discussed above with respect to operation 14-2.

Responsive to receiving a message Msg3 (including a C-RNTI identification for wireless terminal UE) from wireless terminal UE through transceiver 1501 at block 1745 as discussed above with respect to operation 14-3, processor 1503 may transmit DL/UL assignments to wireless terminal UE using the physical downlink control channel PDCCH at block 1746. More particularly, the DL/UL assignments may include a downlink assignment for a MAC message used to communicate resources for D-SR, and an uplink assignment for uplink data to be received from wireless terminal UE. Moreover, the downlink and uplink assignments may be transmitted concurrently or separately.

Processor 1503 may transmit a MAC message through transceiver 1501 to wireless terminal UE in accordance with the DL assignment at block 1747 as discussed above with respect to operation 14-4. More particularly, the MAC message may include a control element CE defining an assignment of resources for dedicated scheduling requests D-SRs available for wireless terminal UE to transmit dedicated scheduling requests to the node. At block 1749, processor 1503 may receive uplink data from wireless terminal UE in accordance with the uplink assignment.

Figure 18C:
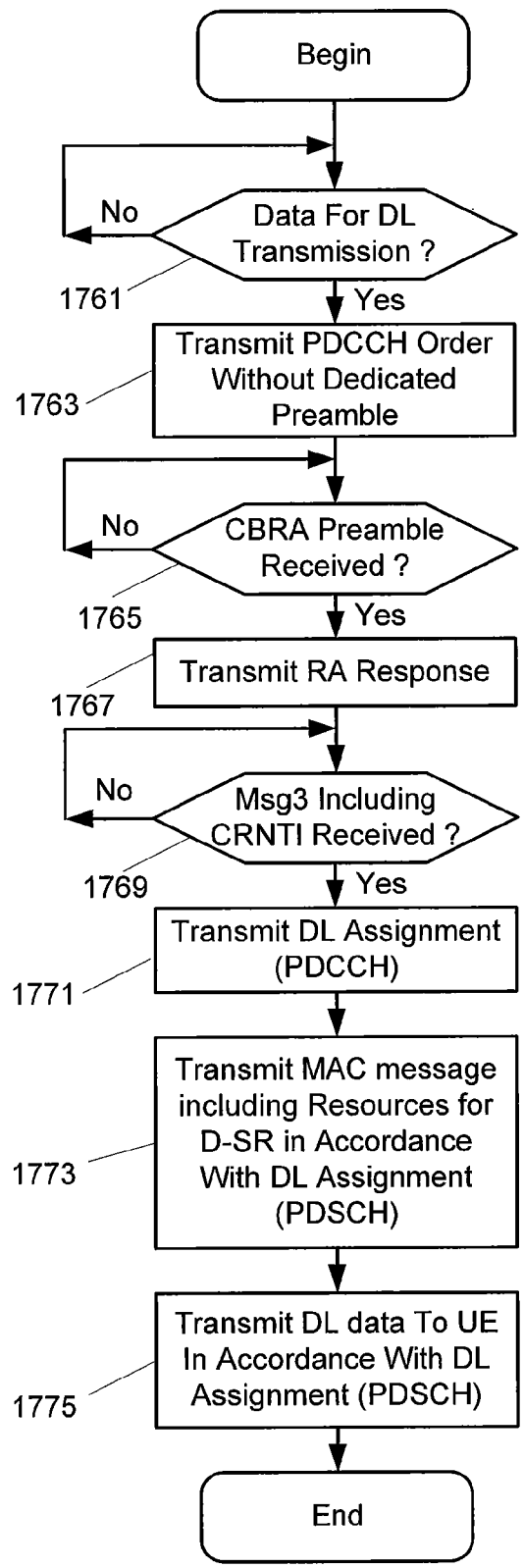

FIG. 18C is a flow chart illustrating base station operations assigning resources for D-SR using contention base random access procedures. Operations of FIG. 18C may be initiated by base station BS at block 1761 in response to buffering of data for downlink transmission from base station BS to wireless terminal UE. Base station processor 1503 may wait at block 1761 until there is data for downlink DL transmission to the wireless terminal UE, and responsive to buffering of such data at block 1761, processor 1503 may transmit a PDCCH (physical downlink control channel) order (with a non-dedicated Preamble, e.g., a preamble of "000000", also referred to as a CBRA preamble) through transceiver 1501 to wireless terminal at block 1763. Once a response is received from wireless terminal UE (including the CBRA preamble) through transceiver 1501 at block 1765, processor 1503 may transmit a random access RA response through transceiver 1501 to wireless terminal UE at block 1767. Base station processor 1503 may then wait at block 1769 until a Msg3 is received from wireless terminal UE including the C-RNTI for the wireless terminal UE.

Responsive to receiving the Msg3 at block 1769, processor 1503 may transmit a DownLink DL assignment over the physical downlink control channel PDCCH at block 1771. At block 1773, processor 1503 may transmit a Medium Access Control (MAC) message through transceiver 1501 to wireless terminal UE using the physical downlink shared channel PDSCH in accordance with the DL assignment of block 1771. The MAC message of block 1773 may include a Control Element CE defining an assignment of resources for dedicated scheduling requests D-SRs available for the wireless terminal UE to transmit dedicated scheduling requests to the node. At block 1775, processor 1501 may transmit the buffered downlink data through transceiver 1501 to wireless terminal UE in accordance with the downlink assignment. According to some embodiments, processor 1503 may perform operations of blocks 1773 and 1775 by multiplexing the control element CE of block 1773 and the DL data of block 1775 in a same MAC message. According to some other embodiments, processor 1503 may transmit separate DL assignments at block 1771 for the D-SR resources of block 1773 and for the DL data of block 1775 so that the D-SR resources of block 1773 and the DL data of block 1775 may be transmitted via different MAC messages and/or at different times.

Figure 19:
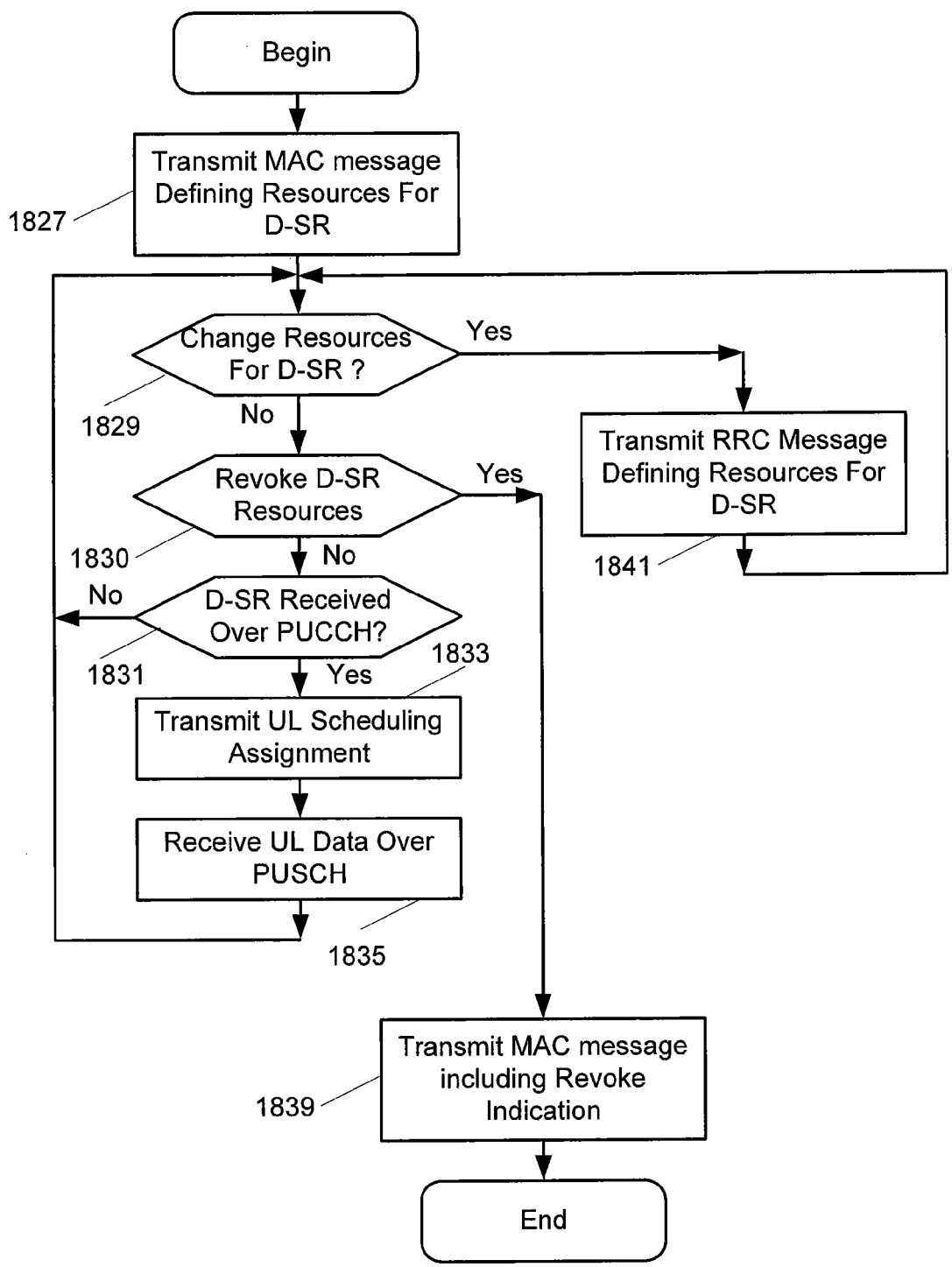

As discussed above with respect to blocks 1727, 1747, and 1773 of FIGS. 18A, 18B, and 18C, base station processor 1503 may thus transmit a MAC message including a control element defining an assignment of resources for D-SRs for wireless terminal UE. FIG. 19 is a flow chart illustrating base station operations using such D-SR resources. At block 1827, processor 1503 may thus transmit a MAC message through transceiver 1501 to wireless terminal UE, for example, as discussed above with respect block 1727 of FIG. 18A, with respect to block 1747 of FIG. 18B, or with respect to block 1773 of FIG. 18C. More particularly, the Medium Access Control MAC message may include a Control Element CE defining an assignment of resources for dedicated scheduling requests D-SRs available for the wireless terminal UE to transmit dedicated scheduling requests to the node.

For example, the CE may include a code frequency domain index field with a code frequency domain index identifying one of a plurality of code frequency domain resources available for the wireless terminal to transmit dedicated scheduling requests. The CE may also include a time domain index field with a time domain index identifying one of a plurality of time domain resources available for the wireless terminal to transmit dedicated scheduling requests. Moreover, the assignment of resources may define a time domain for the resources available for the wireless terminal to transmit dedicated scheduling requests, and the time domain may be defined based on a subframe time offset and a time periodicity.

As long as processor 1503 does not change the D-SR resources for wireless terminal UE at block 1829 and does not revoke D-SR resources at block 1830, processor 1503 may monitor for dedicated scheduling requests received from wireless terminal UE received over PUCCH at block 1831. Processor 1503 may thus receive a dedicated scheduling request D-SR from wireless terminal UE through transceiver 1501 over a Physical Uplink Control Channel PUCCH at block 1831 using one of the resources defined according to the subframe time offset and the time periodicity.

Responsive to receiving the dedicated scheduling request over the PUCCH at block 1831, processor 1503 may transmit an uplink scheduling assignment through transceiver 1501 to wireless terminal UE for a Physical Uplink Shared Channel PUSCH at block 1833. After transmitting the uplink scheduling assignment, processor 1503 may receive uplink data through transceiver 1501 from the wireless terminal over the PUSCH at block 1853 in accordance with the uplink scheduling assignment.

As long as the assigned D-SR resources for wireless terminal UE are maintained (not revoked) at block 1830 and are not changed at block 1829, processor 1503 may continue operations of blocks 1831, 1833 and 1835 as discussed above based on the initial D-SR resources assigned via the MAC message of block 1827 (e.g., via block 1727, block 1747, or block 1773).

If processor 1503 should decide to change the D-SR resource assignment for wireless terminal UE at block 1829, however, a new assignment may be transmitted using an RRC message. According to some embodiments discussed above with respect to FIGS. 6, 7, 9, and 11, D-SR resource assignments via a MAC message control element may be limited to only the fastest D-SR resources (e.g., having a periodicity of 10 ms or less), and processor 1503 may choose to assign a slower D-SR resource (e.g., having a periodicity of 10 ms or greater) to conserve resources. Such slower D-SR resources may be assigned as discussed below.

Responsive to deciding to change the D-SR resource assignment for wireless terminal UE at block 1829, processor 1503 may transmit a Radio Resource Control RRC message including the new D-SR resource assignment through transceiver 1501 to wireless terminal UE at block 1841. The RRC message may include a second time domain index field larger than the first time domain index field of the MAC message CE with a second time domain index identifying one of a second plurality of time domain resources available for the wireless terminal to transmit dedicated scheduling requests. For example, the first time domain index field may include 4 bits, and the second time domain index field may include 8 bits. Moreover, the first plurality of time domain resources available for the MAC message CE may be different than the second plurality of time domain resources available for the RRC message. The RRC message may include a second code frequency domain index field larger than the first code frequency domain index field of the MAC message CE with a second code frequency domain index identifying one of a second plurality of code frequency domain resources available for the wireless terminal to transmit dedicated scheduling requests. Moreover, the first plurality of code frequency domain resources available for the MAC message CE may be different than the second plurality of code frequency domain resources available for the RRC message.

According to some embodiments, the first plurality of time domain resources available for MAC CE signaling may be a subset of the second plurality of time domain resources available for RRC signaling. For example, the first plurality of time domain resources may include SR configuration indices 0-12 and 155-157 (16 time domain resources) of FIG. 10, and the second plurality of time domain resources may include SR configuration indices 0-157 (158 time domain resources). According to some other embodiments, the first plurality of time domain resources and the second plurality of time domain resources may be mutually exclusive. For example, the first plurality of time domain resources may include SR configuration indices 0-12 and 155-157 (16 time domain resources) of FIG. 10, and the second plurality of time domain resources may include SR configuration indices 13-154 (142 time domain resources).

Upon transmitting the RRC message defining new resources for D-SR for wireless terminal UE, base station processor 1503 may implicitly revoke resources for D-SR that were previously assigned for wireless terminal UE thereby allowing use of such previously assigned resources for another wireless terminal. According to some embodiments, initial resources for D-SR for wireless terminal UE may be assigned via a MAC message CE at block 1827, and subsequent assignments of resources for D-SR for wireless terminal UE may be provided via RRC messages at blocks 1829 and 1841.

In addition, the MAC message CE of block 1827 may include a D-SR message type identifier and an Assign/Revoke field having a first Assign/Revoke value to indicate assignment of the defined resources. At block 1830, processor 1503 may determine to revoke D-SR resources previously allocated to wireless terminal UE at either of blocks 1827 or 1841. Responsive to determining to revoke the assignment of resources for dedicated scheduling requests at block 1830, processor 1503 may transmit a second MAC message through transceiver 1501 to the wireless terminal UE at block 1839. More particularly, the second MAC message may include a second Control Element CE including the D-SR message type identifier and an Assign/Revoke field having a second Assign/Revoke value different than the first Assign/Revoke value. After transmitting the MAC message of block 1839, processor 1503 may reassign the previously assigned D-SR resource to another wireless terminal, and the wireless terminal UE receiving the MAC message of block 1839 may be required to perform a random access procedure before a next data transmission as a not UL synchronized RRC connected wireless terminal UE.

FIGS. 20A-C and 21 are flow charts illustrating operations of wireless terminal UE of FIGS. 15A-B and 17 according to some embodiments of inventive concepts.

FIG. 20A is a flow chart illustrating wireless terminal operations assigning resources for D-SR using contention free random access procedures as discussed above with respect to FIG. 13, and corresponding to base station operations of FIG. 18A. Operations of FIG. 20A may be initiated responsive to base station BS receiving data for downlink transmission to wireless terminal UE. At block 1921, wireless terminal UE processor 1603 may wait to receive a PDCCH order from base station BS to initiate a CFRA procedure. According to some embodiments of inventive concepts, the PDCCH order may include a contention free random access CFRA preamble identification ID to initiate a downlink data transmission of downlink data as discussed above with respect to operation 14-1.

Responsive to receiving such a PDCCH order through transceiver 1601 at block 1921, processor 1601 may transmit the CFRA preamble back to base station BS at block 1922 as discussed above with respect to operation 13-2. Responsive to receiving a random access response through transceiver 1601 at block 1923 as discussed above with respect to operation 13-3, processor 1603 may transmit through transceiver 1601 over the physical uplink shared channel PUSCH at block 1925 as discussed above with respect to operation 13-4.

At block 1926, processor 1603 may receive a DL assignment from base station BS through transceiver 1601 using the physical downlink control channel PDCCH. The DL assignment may be a single downlink assignment for both a D-SR resource assignment and a DL data transmission, or separate DL assignments may be provided for a D-SR resource assignment and for a DL data transmission.

At block 1927, processor 1603 may receive a Medium Access Control MAC message through transceiver 1601 from base station BS using the physical downlink shared channel in accordance with the DL assignment as discussed above with respect to operation 1305. The MAC message may include a Control Element CE defining an assignment of resources for dedicated scheduling requests D-SRs available for the wireless terminal UE to transmit dedicated scheduling requests to the node. At block 1929, processor 1603 may receive a downlink data transmission of downlink data from base station BS through transceiver 1601 in accordance with the downlink assignment. According to some embodiments, the control element and the DL data transmission may be multiplexed using a same MAC message so that only one DL assignment is needed at block 1926. According to some other embodiments, one MAC message may be used for the control element defining the assignment of resources for D-SRs and another MAC message may be used for the DL data transmissions so that two DL assignments may be received at block 1926. If two DL assignments are received at block 1926, the two DL assignments may be received at different times, e.g., concurrently with receiving the respective transmissions of blocks 1927 and 1929.

FIG. 20B is a flow chart illustrating wireless terminal operations assigning resources for D-SR using contention based random access procedures as discussed above with respect to FIG. 14, and corresponding to base station operations of FIG. 18B. Operations of FIG. 20B may be initiated responsive to wireless terminal processor 1603 receiving/generating/buffering data for uplink transmission to base station BS. Responsive to wireless terminal processor 1603 receiving/generating/buffering data for uplink transmission at block 1941, processor 1603 may transmit a contention based random access CBRA preamble to base station BS over a random access channel (e.g., Physical Random Access Channel PRACH) at block 1943. Responsive to receiving a random access RA response from base station BS through transceiver 1601 at block 1945, as discussed above with respect to operation 14-2, processor 1601 may transmit a message Msg3 (including a C-RNTI identification for wireless terminal UE) through transceiver 1601 to base station BS at block 1947 as discussed above with respect to operation 14-3.

Processor 1603 may then receive DL/UL assignments through transceiver 1601 from base station BS using the physical downlink control channel PDCCH at block 1948. More particularly, the DL/UL assignments may include a downlink assignment for a MAC message used to communicate resources for D-SR, and an uplink assignment for the uplink data to be transmitted from wireless terminal UE to base station BS. Moreover, the downlink and uplink assignments may be transmitted concurrently or separately.

At block 1949, processor 1603 may then receive a MAC message through transceiver 1601 from base station BS in accordance with the DL assignment as discussed above with respect to operation 14-4. More particularly, the MAC message may include a control element CE defining an assignment of resources for dedicated scheduling requests D-SRs available for wireless terminal UE to transmit dedicated scheduling requests to the node. At block 1951, processor 1603 may transmit uplink data through transceiver 1601 to base station BS in accordance with the uplink assignment.

FIG. 20C is a flow chart illustrating wireless terminal operations assigning resources for D-SR using contention based random access procedures corresponding to base station operations of FIG. 18C. Operations of FIG. 20C may be initiated by base station BS in response to base station BS buffering of data for downlink transmission to wireless terminal UE. Wireless terminal UE processor 1603 may wait at block 1961 to receive a PDCCH order. Responsive to receiving a PDCCH order without a dedicated CFRA preamble (e.g., with a non-dedicated preamble of "000000", also referred to as a CBRA preamble), processor 1603 may transmit the CBRA preamble through transceiver 1601 to base station BS at block 1962.

Responsive to receiving a random access response from base station BS through transceiver 1601 at block 1963, processor 1603 may transmit a Msg 3 including the C-RNTI for the wireless terminal UE through transceiver 1601 to base station BS at block 1965. Processor 1603 may then receive a DownLink DL assignment over the physical downlink control channel PDCCH through transceiver 1601 from base station BS at block 1966.

At block 1967, processor 1603 may receive a Medium Access Control (MAC) message through transceiver 1601 from base station BS using the physical downlink shared channel PDSCH in accordance with the DL assignment of block 1966. The MAC message of block 1967 may include a Control Element CE defining an assignment of resources for dedicated scheduling requests D-SRs available for the wireless terminal UE to transmit dedicated scheduling requests to base station BS. At block 1969, processor 1601 may receive the buffered downlink data through transceiver 1601 from base station BS in accordance with the downlink assignment. According to some embodiments, processor 1603 may perform operations of blocks 1967 and 1969 with the control element CE of block 1967 and the DL data of block 1969 multiplexed in a same MAC message. According to some other embodiments, processor 1603 may receive separate DL assignments at block 1966 for the D-SR resources of block 1967 and for the DL data of block 1969 so that the D-SR resources of block 1967 and the DL data of block 1969 may be received via different MAC messages and/or at different times.

Figure 21:
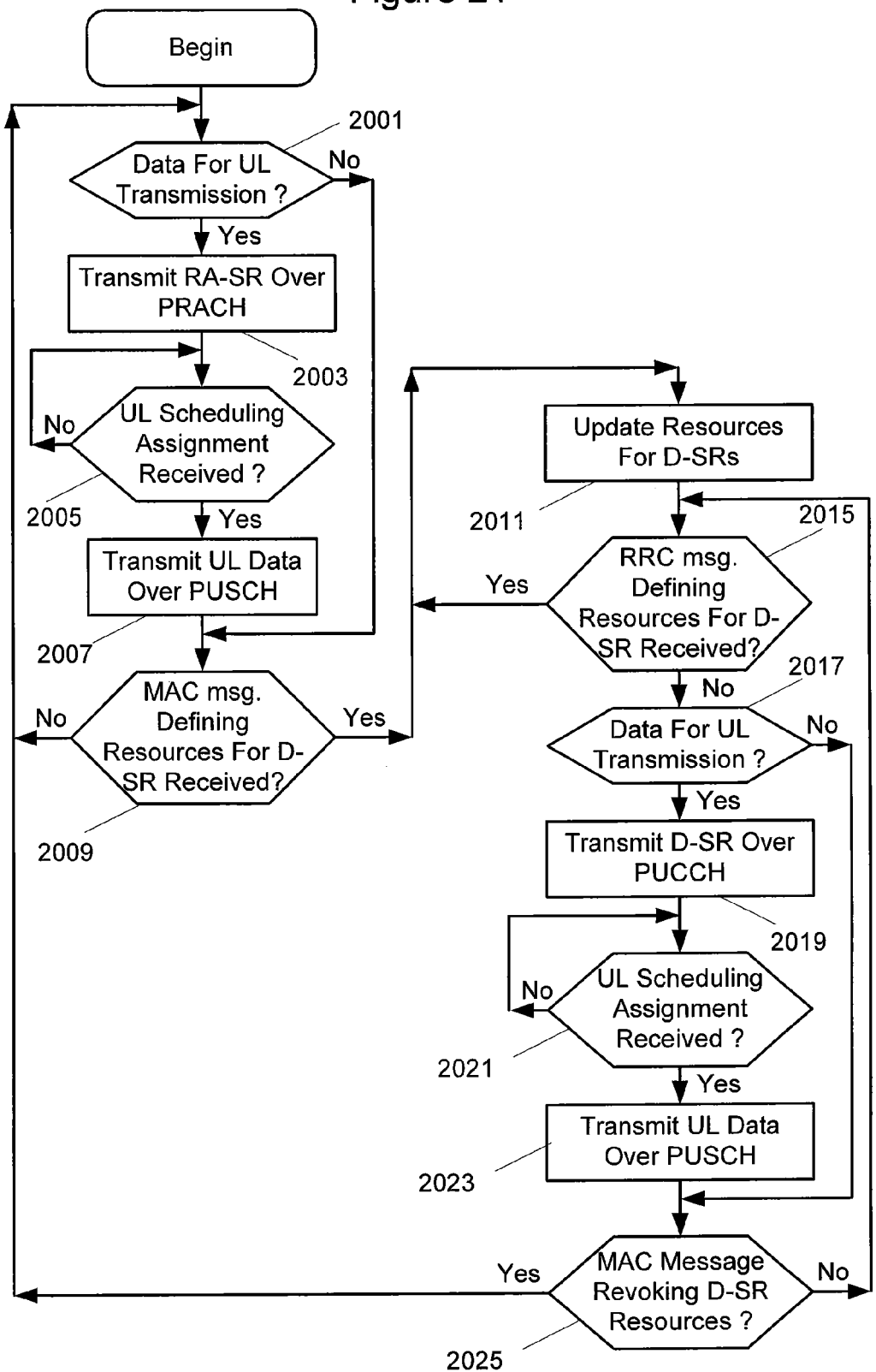

As discussed above with respect to FIGS. 20A, 20B, and 20C, wireless terminal processor 1603 may thus receive a MAC message including a control element defining an assignment of resources for D-SRs. FIG. 21 is a flow chart illustrating wireless terminal operations using such D-SR resources.

Until resources for D-SRs are received via a MAC message as discussed above with respect to blocks 1927, 1949, and/or 1967 of FIGS. 20A-C, scheduling for uplink transmission from wireless terminal UE to base station BS may be performed using random access scheduling requests RA-SRs over the physical random access channel PRACH as shown by blocks 2001, 2003, 2005, and 2007 of FIG. 21. Wireless terminal UE may thus operate as a not UL synchronized RRC connected wireless terminal UE.

Responsive to determining that uplink data is available for transmission to base station BS (e.g., responsive to receiving, generating, and/or buffering data for uplink transmission) at block 2001, processor 1063 may transmit a random access scheduling request RA-SR through transceiver 1601 to base station BS at block 2003. Responsive to receiving a UL scheduling assignment from base station BS through transceiver 1601 at block 2005, processor 1603 may transmit uplink data through transceiver 1601 over the physical uplink shared channel PUSCH to base station BS at block 2007. Processor 1603 may repeat operations of blocks 2001, 2003, 2005, and 2007 for each uplink transmission until resources for D-SRs are received via a MAC message at block 2009. Such a MAC message may be received as discussed above with respect to blocks 1927, 1949, and/or 1967 of FIGS. 20A-C.

As discussed above, the MAC message of block 2009 may include a Control Element CE defining an assignment of resources for dedicated scheduling requests D-SRs available for wireless terminal UE to transmit dedicated scheduling requests over the physical uplink control channel PUCCH to base station BS. More particularly, the CE may include a code frequency domain index field with a code frequency domain index identifying one of a plurality of code frequency domain resources available for wireless terminal UE to transmit dedicated scheduling requests and a time domain index field with a time domain index identifying one of a plurality of time domain resources available for the wireless terminal UE to transmit dedicated scheduling requests. The code frequency domain index field may be provided as discussed above with respect to Index-1 of FIGS. 6, 7, 8, and 11, and the time domain index field may be provided as discussed above with respect to Index-2 of FIGS. 6, 7, 8, and 11. For example, each time domain resource may be defined based on a subframe time offset and a time periodicity. Responsive to receiving such a MAC message at bock 2009, processor 1603 may update resources for D-SRs dedicated scheduling requests at block 2011.

As long as resources for D-SRs remain unchanged at block 2015 and D-SR resources are not revoked at block 2025, processor 1603 may process uplink transmissions using the assigned resources for D-SRs as discussed with reference to blocks 2017, 2019, 1021, and 2023. For example, responsive to generating, receiving, and/or buffering data for uplink transmission to base station BS at block 2017 after receiving the MAC message CE including the assignment of resources for D-SRs at block 2009, processor 1603 may transmit a dedicated scheduling request D-SR over a Physical Uplink Control Channel PUCCH using one of the resources defined according to the subframe time offset and the time periodicity of the assignment at block 2019. Responsive to receiving an uplink scheduling assignment for a Physical Uplink Shared Channel PUSCH at block 2021, processor 1603 may transmit uplink data through transceiver 1601 to base station BS over the PUSCH in accordance with the uplink scheduling assignment at block 2023. Operations of blocks 2017 to 2023 may be repeated for each uplink transmission using the initial D-SR resources of block 2009 until new D-SR resources are received via an RRC message at block 2015, or until D-SR resources are revoked at block 2025. With the assigned resources for D-SRs, wireless terminal UE may operate as a UL synchronized RRC connected wireless terminal UE.

Responsive to receiving an RRC message through transceiver 1601 from base station BS defining resources for different D-SR resources at block 2015, processor 1603 may update/change resources to be used for D-SRs at block 2011. By way of example, the MAC message control element of block 2009 may include a first (initial) time domain index field with a first time domain index defining one of a first plurality of time domain resources so that the initial assignment of D-SR resources is determined based on the first time domain index. The RRC message of block 2011 may include a second (subsequent) time domain index field (larger than the first time domain index field) with a second time domain index identifying one of a second plurality of time domain resources so that a second assignment of D-SR resources is determined based on the second time domain index. The first time domain index field may include 4 bits so that the first plurality of time domain resources may include 16 of the SR configurations discussed above with respect to FIG. 10, and the second time domain index field may include 8 bits so that the second plurality of time domain resources may include 142 or 158 of the SR configurations of FIG. 10.

According to some embodiments, the first plurality of time domain resources may be a subset of the second plurality of time domain resources. For example, the first plurality of time domain resources (available for assignment via MAC messages of block 2009) may include SR configurations 0-12 and 155-157 of FIG. 10, and the second plurality of time domain resources (available for assignment via RRC messages of block 2015) may include SR configurations 1-157. According to some other embodiments, the first plurality of time domain resources and the second plurality of time domain resources may be mutually exclusive. For example, the first plurality of time domain resources (available for assignment via MAC messages of block 2009) may include SR configurations 0-12 and 155-157 of FIG. 10, and the second plurality of time domain resources (available for assignment via RRC messages of block 2015) may include SR configurations 13-154.

Similarly, the MAC message control element of block 2009 may include a first code frequency domain index field with a first code frequency domain index identifying one of a first plurality of code frequency domain resources, and the RRC message of block 2015 may include a second code frequency domain index field (larger than the first code frequency domain index field) with a second code frequency domain index identifying one of a second plurality of code frequency domain resources available for the wireless terminal to transmit dedicated scheduling requests. Accordingly, a first plurality of code frequency domain resources available for assignment via a MAC message CE of block 2009 may be different than the second plurality of code frequency domain resources available for assignment via an RRC message of block 2015.

Upon receipt of an RRC message at block 2015 defining new/different resources for D-SRs, processor 1603 may update resources for D-SRs at block 2011 (including revocation of use of any previously assigned D-SR resource), and processor 1063 may proceed with operations of blocks 2017, 2019, 2021, and 2023 using the D-SR resourced defined by the most recent RRC message until either another RRC message is received at block 2015 defining other resources for D-SRs or until all D-SR resources are revoked at block 2025.

In addition, the MAC message control element of block 2009 may include a D-SR message type identifier and an Assign/Revoke field having a first Assign/Revoke value indicating assignment of resources for D-SRs. Another MAC message control element including the same D-SR message type identifier but a different Assign/Revoke value (different than the first Assign/Revoke value) may be used to revoke assignment of D-SR resources. Responsive to receiving such a MAC message including a control element CE including the D-SR message type identifier and the Assign/Revoke field having the Assign/Revoke value indication revocation, processor 1603 may return to operations of blocks 2001, 2003, 2005, and 2007 using random access scheduling requests for uplink data transmissions as a not UL synchronized RRC connected wireless terminal UE.

Stated in other words, wireless terminal UE may operate in a not UL synchronized RRC connected mode at blocks 2001, 2003, 2005, and 2007 using random access scheduling requests for uplink data transmissions until a MAC message control element is received defining resources for dedicated scheduling requests at block 2009. As long as resources for dedicated scheduling requests are assigned to wireless terminal UE, wireless terminal UE may operate in a UL synchronized RRC connected state at blocks 2017, 2019, 2021, and 2023 using dedicated scheduling requests for uplink data transmissions until a MAC message control element is received revoking all D-SR resources at block 2025. While operating in the UL synchronized RRC connected state, RRC messages at block 2015 may be used to change D-SR resources assigned to wireless terminal UE.

FIGS. 22A-C, 23A-C, and 24A-D are message diagrams illustrating assignment and use of D-SR resources according to some embodiments of inventive concepts.

Figure 22A:
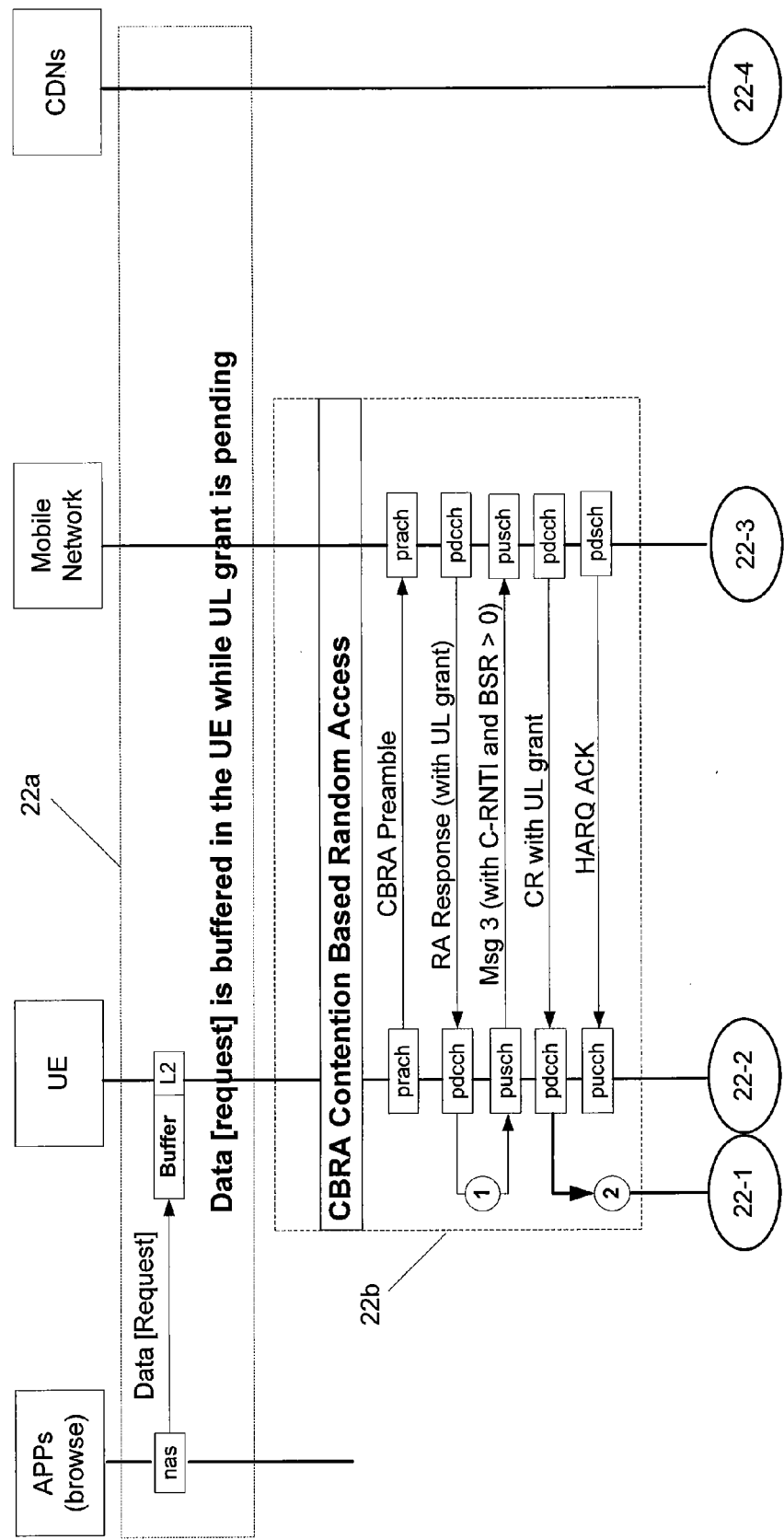
FIGS. 22A-C, 23A-C, and 24A-D are message diagrams illustrating D-SR assignments and scheduling requests according to some embodiments of inventive concepts.
Figure 22B:
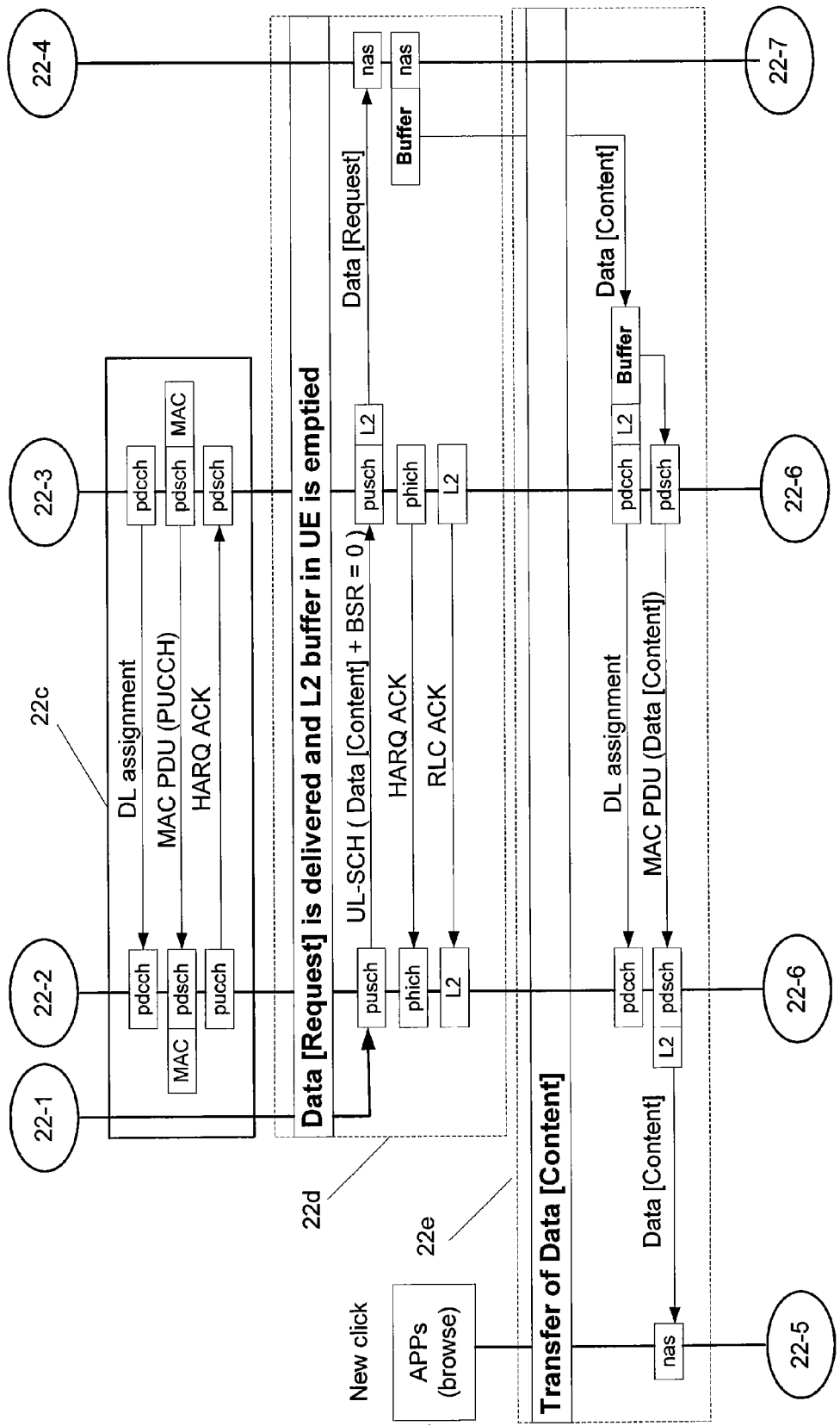
Figure 22C:
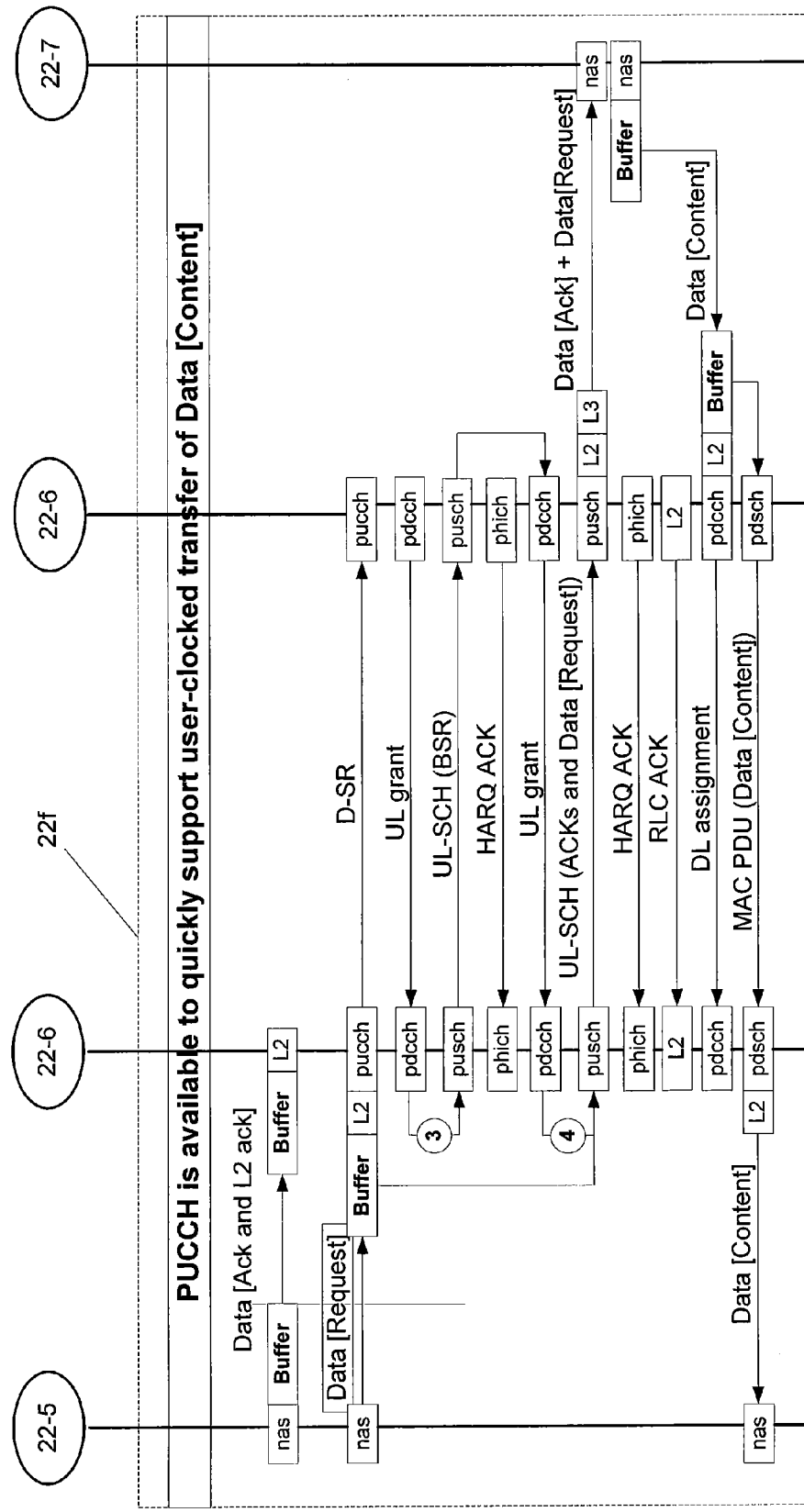

FIGS. 22A-C illustrate embodiments of inventive concepts based on a wireless terminal performing web browsing using a browser application APP at wireless terminal UE when requesting downlink data. Responsive to user input when the wireless terminal is in a not UL synchronized RRC connected state requesting a media download, the browser application may generate/buffer a request for download data at block 22a.

Responsive to the request of block 22a, wireless terminal processor 1603 may use contention based random access CBRA at block 22b to initiate communication with the mobile network base station BS. Modem layers of wireless terminal UE may first be used to select a random access resource and transmit a CBRA preamble on PRACH. Wireless terminal UE may then receive a RA response corresponding to the CBRA preamble, and may use the UL grant (1) enclosed with the RA response to transmit wireless terminal identifier C-RNTI in the Msg3. The mobile network base station BS resolves any contention and notifies wireless terminal UE as being the winner by sending contention resolution CR message with a UL grant addressed to the C-RNTI of wireless terminal UE. Otherwise, (not shown) wireless terminal UE does not receive such a UL grant for CR contention resolution (or wireless terminal UE did not receive the random access response), and wireless terminal UE proceeds and selects a new random access resource (repeating operations of block 22b).

At block 22c, a DL assignment and a MAC message (shown as a MAC PDU transmitted over PUCCH) may be transmitted from base station BS to wireless terminal UE, with the MAC message including an assignment of resources of D-SRs as discussed above. At block 22d, wireless terminal may use the UL grant (2) from block 22b in accordance with standardized priorities and logical channel prioritization to transmit uplink data and a buffer status report BSR at block 22d. The Buffer Status Report may describe a size of each buffer in wireless terminal UE and may have a highest priority. The radio access network base station BS acknowledges the data received on UL-SCH and grants UL resources in accordance with the BSR (or stops granting if BSR is 0). The sequence may continue as orchestrated by the L2 layers of the network at block 22e. Responsive to a subsequent request from application APP (e.g., due to user input), UL scheduling requests may be processed using dedicated scheduling requests D-SRs at block 22f based on resources assigned via the MAC message of block 22c.

Figure 23A:
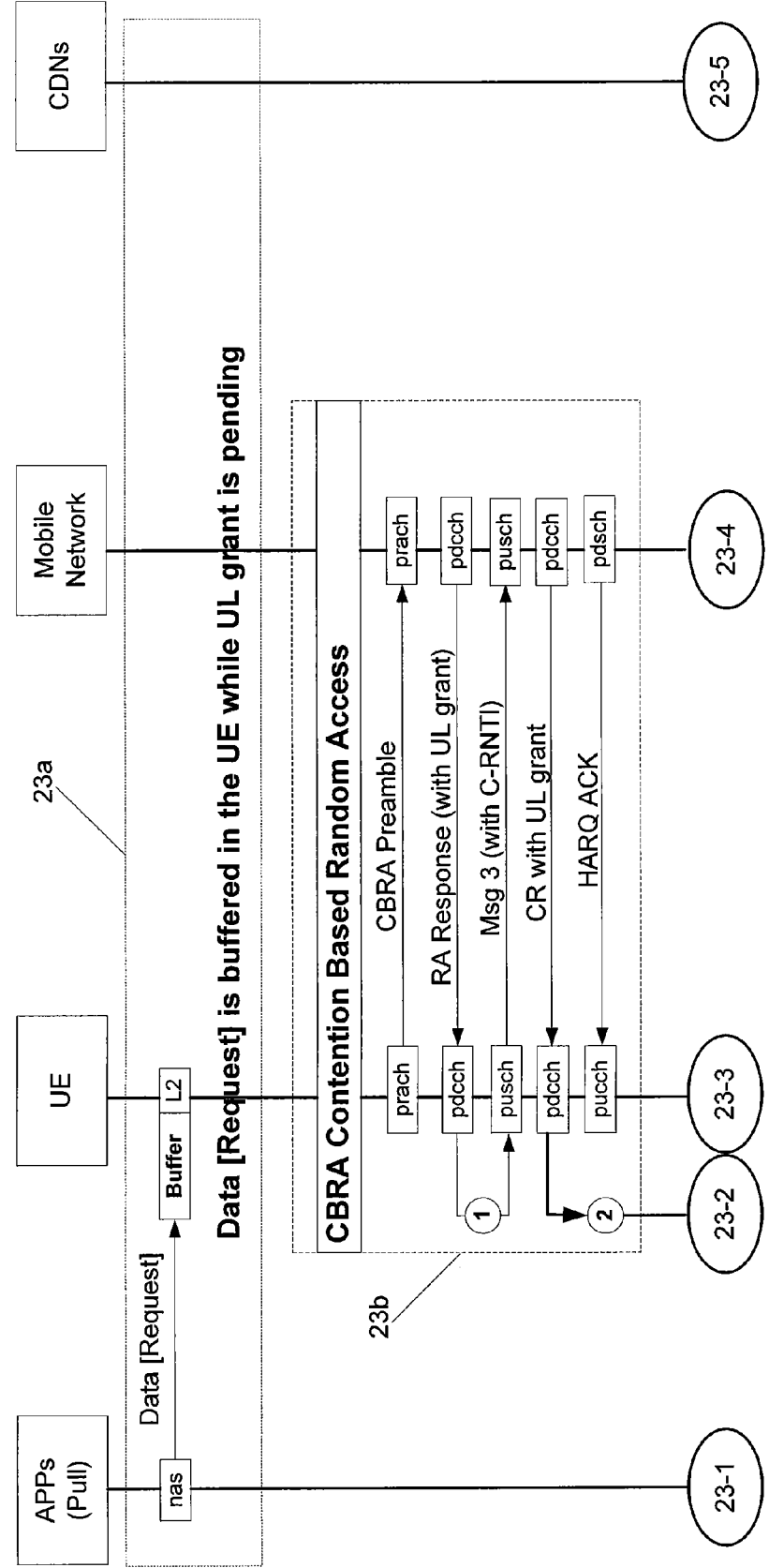
Figure 23B:
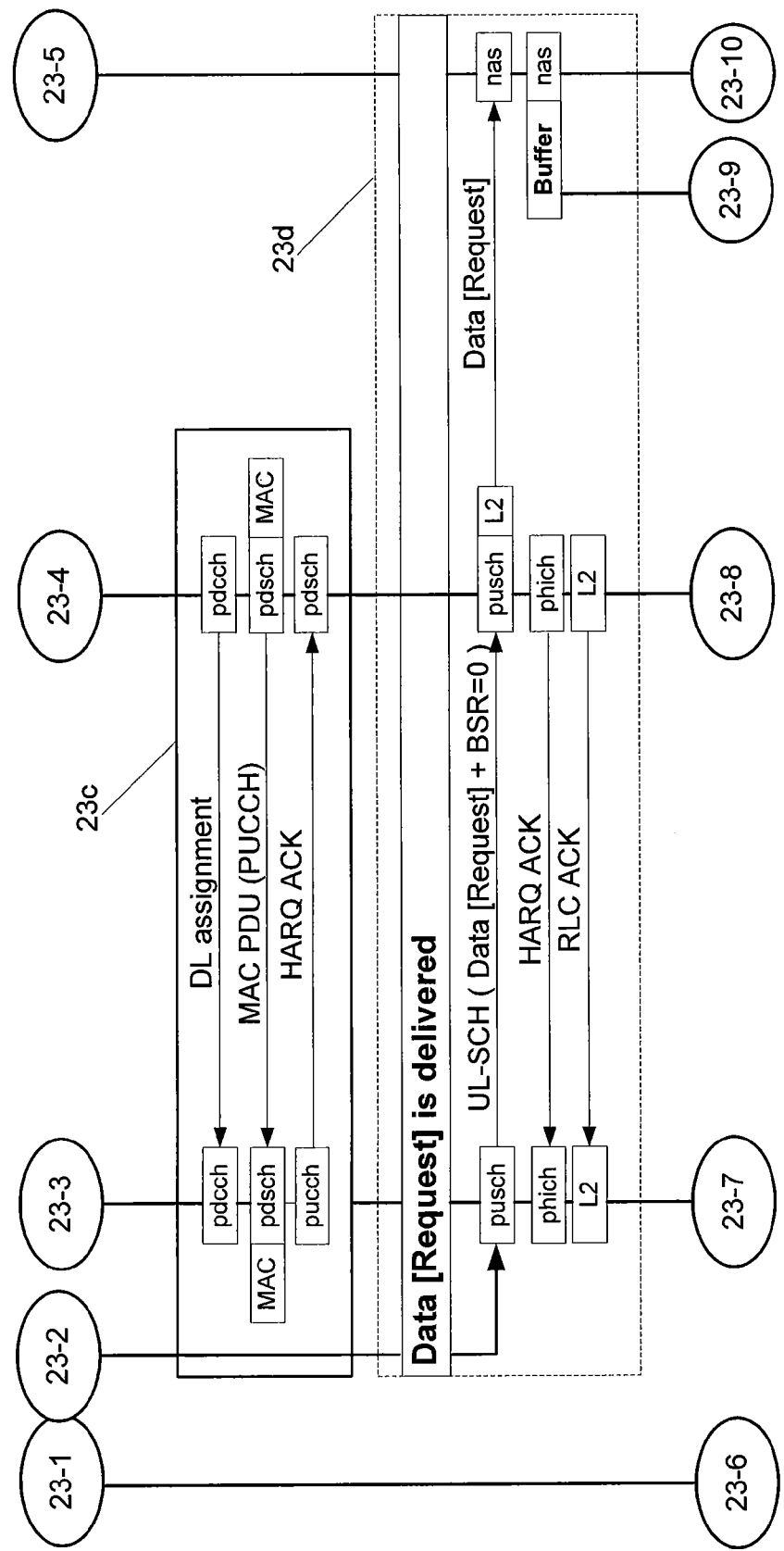
Figure 23C:
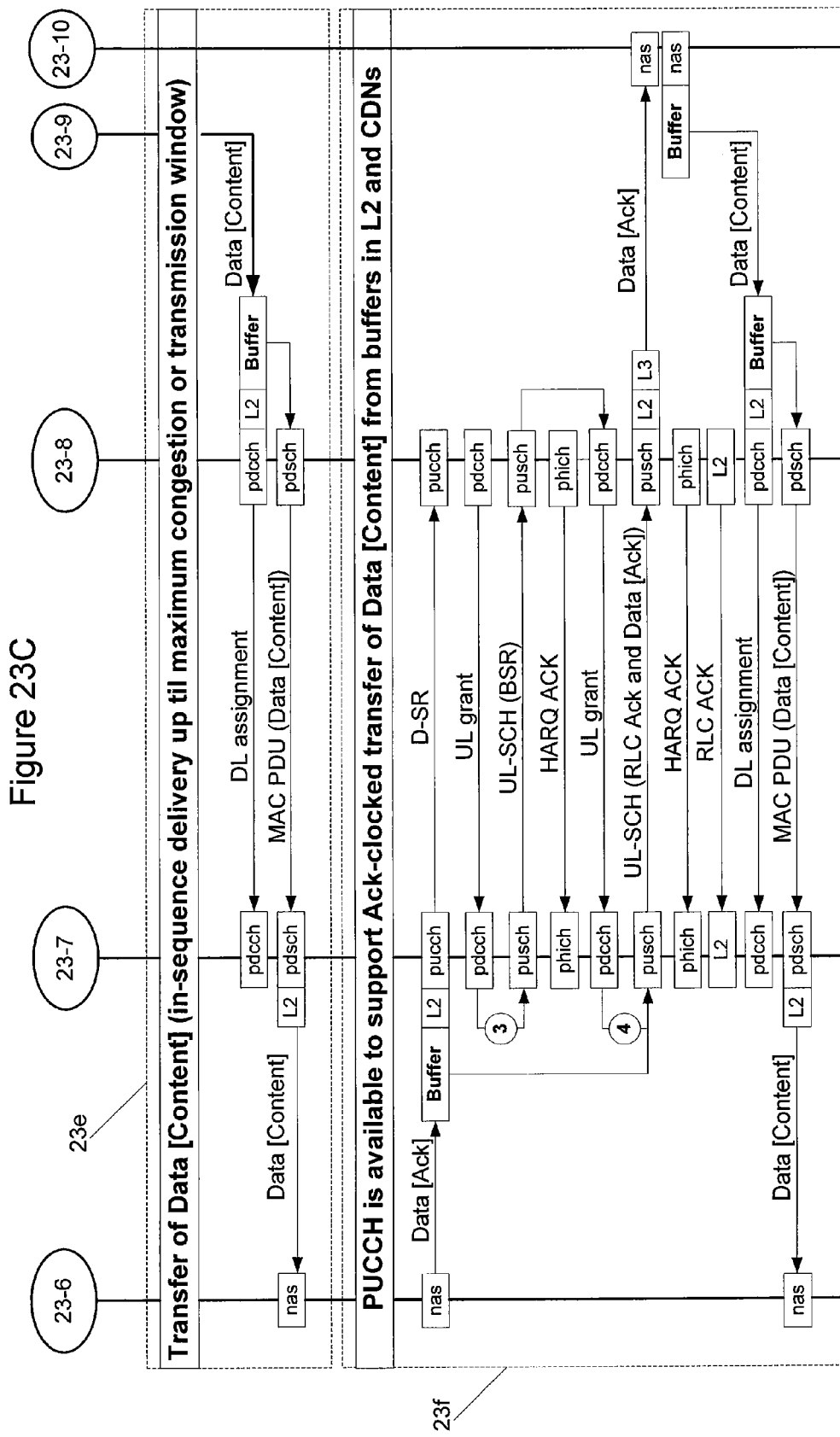
Figure 24A:
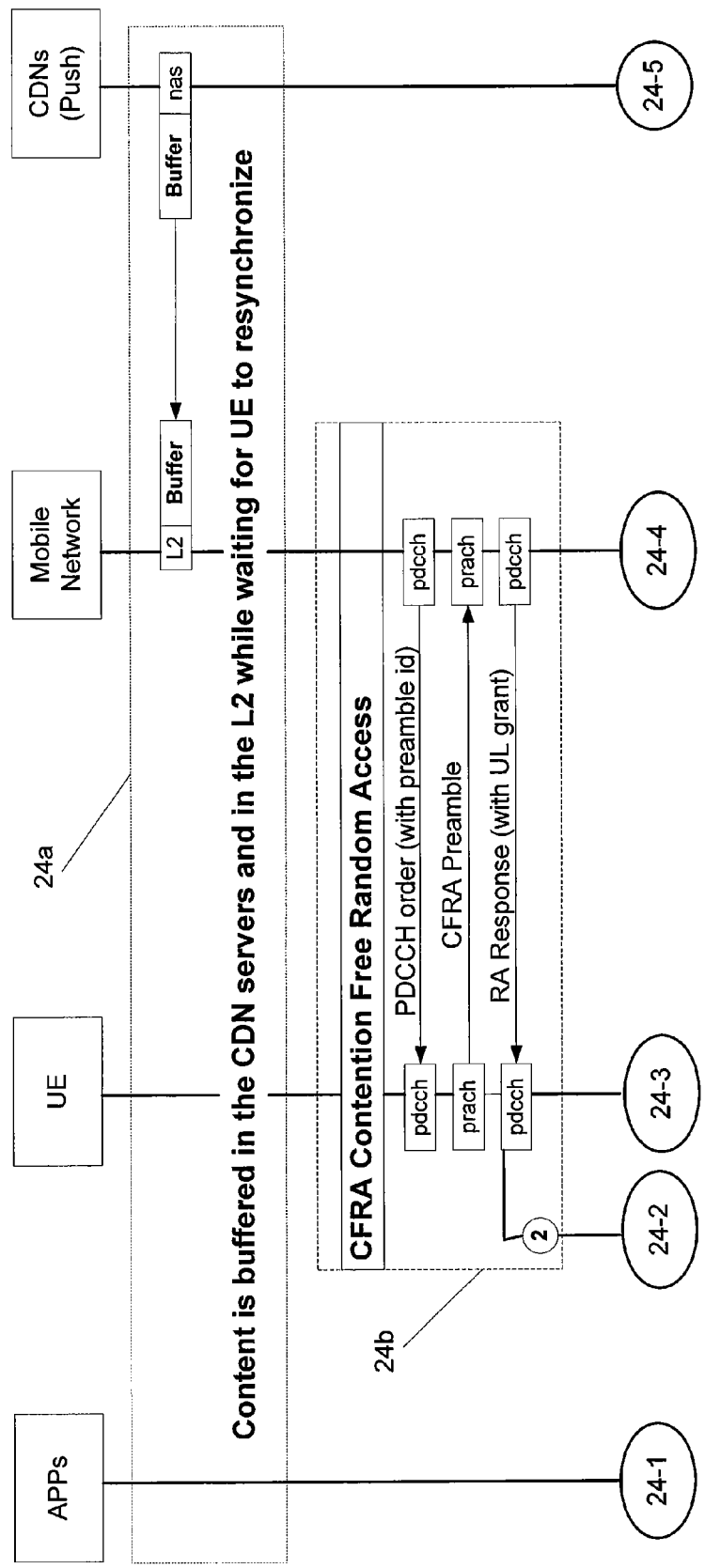
Figure 24B:
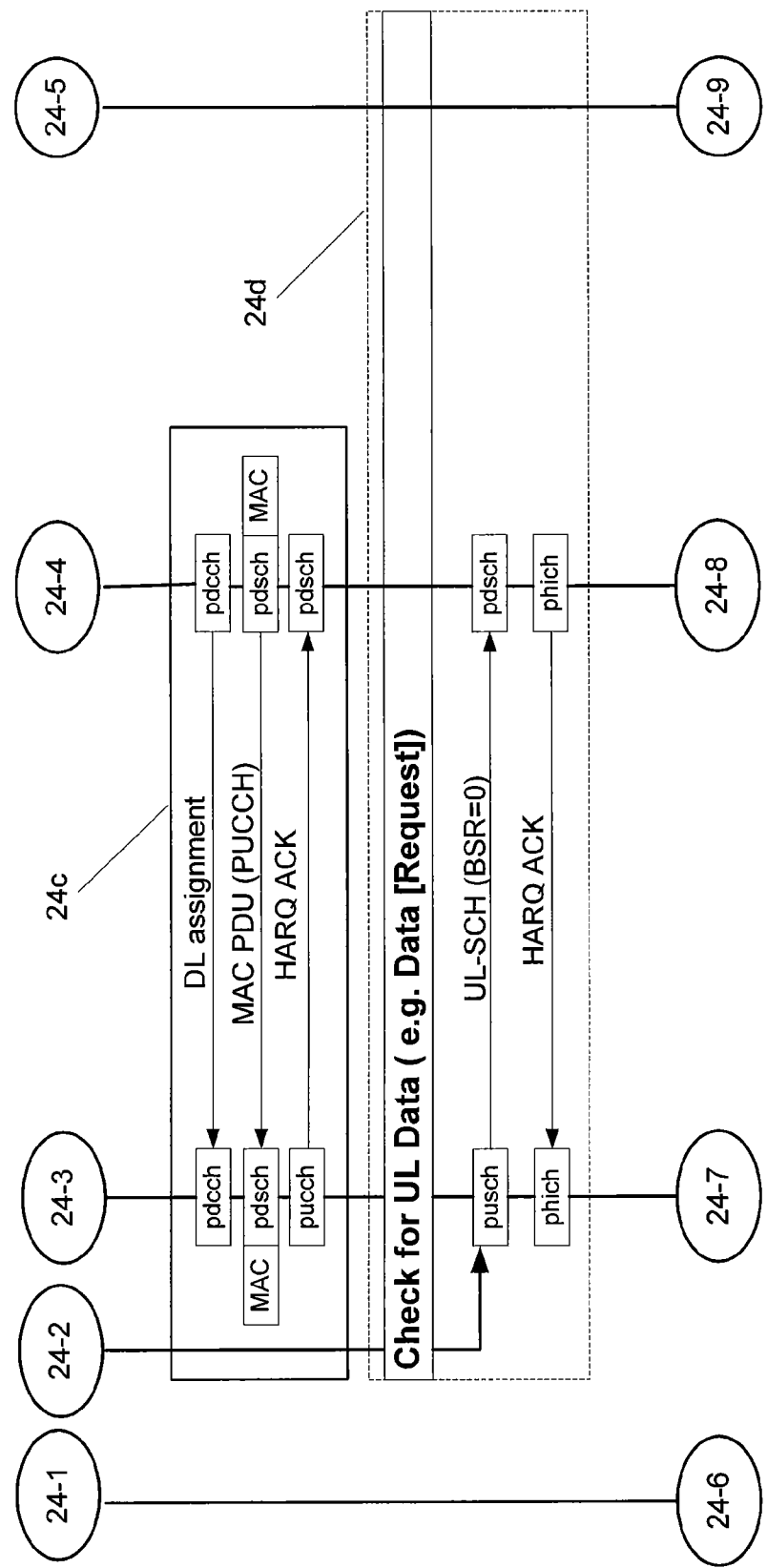
Figure 24C:
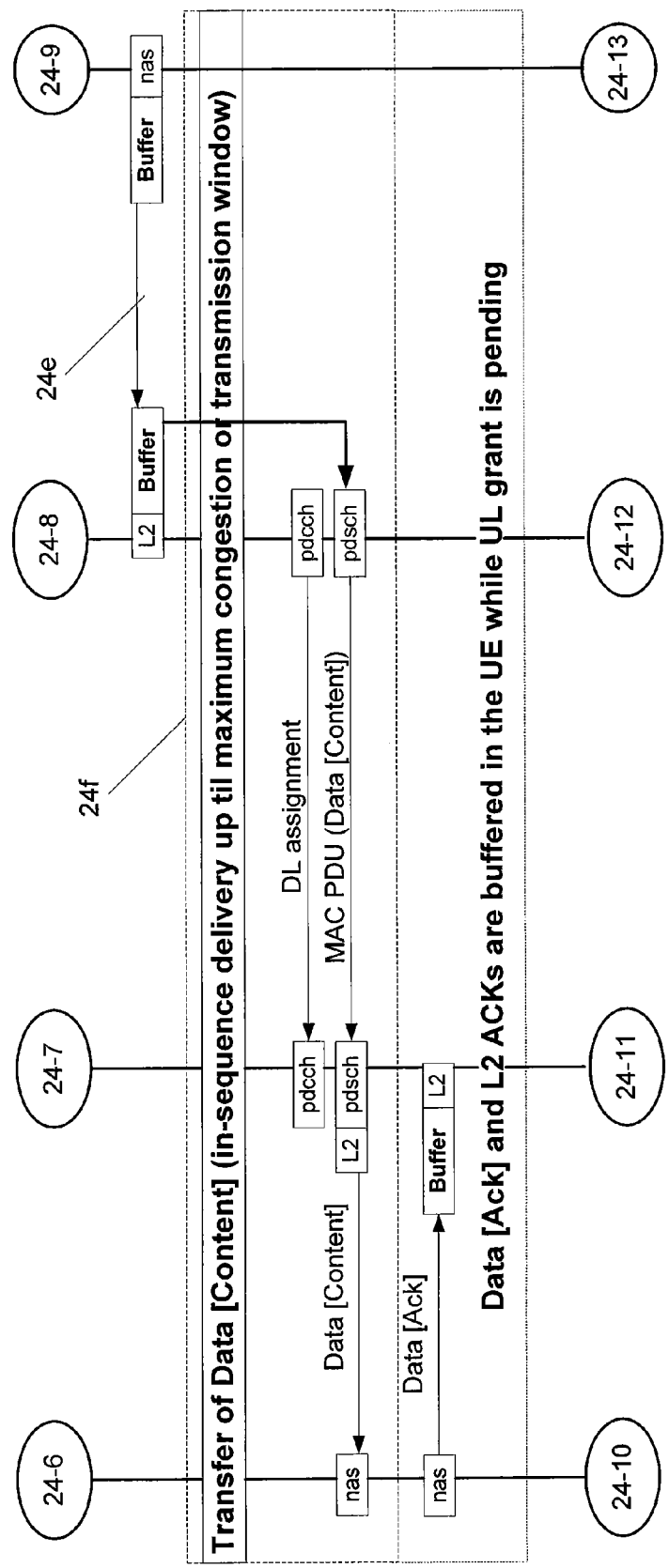
Figure 24D:
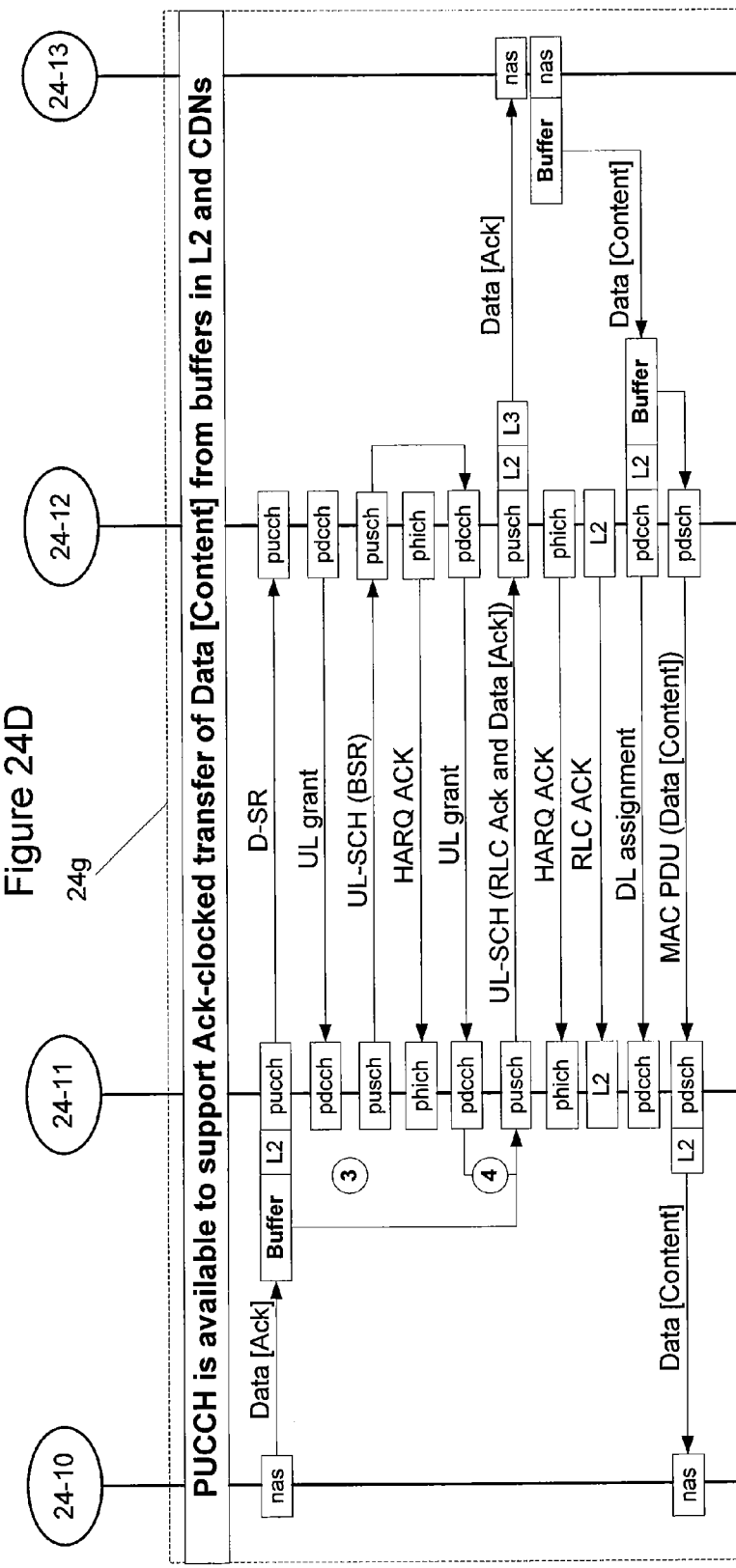

FIGS. 23A-C illustrate embodiments of inventive concepts based on a wireless terminal performing web browsing using a browser application APP at wireless terminal UE when requesting downlink streaming data. Operations of blocks 23a, 23b, 23c, 23d, and 23e are similar to respective operations of blocks 22a, 22b, 22c, 22d, and 22e discussed above with respect to FIGS. 22A-C. In block 23f, however, the wireless terminal ACK of block 23f (acknowledging receipt of data of block 22e) may trigger a dedicated scheduling request over PUCCH using D-SR resources assigned using the MAC message of block 23c.

FIGS. 24A-D illustrate embodiments of inventive concepts based on a content delivery network CDN pushing data to a application APP running on wireless terminal UE. Responsive to mobile network base station BS receiving/ buffering data for downlink transmission to wireless terminal UE at block 24a, mobile network base station BS may initiate the downlink transmission using a contention free random access procedure at block 24b. At block 24c, mobile network base station BS may transmit the DL assignment and associated MAC message assigning resources for D-SRs, and at block 24d, wireless terminal UE may transmit uplink data including a buffer status report responsive to the RA response of block 24b.

At blocks 24e and 24f, mobile network base station BS may transmit additional DL data received from the content data network. At block 24g, wireless terminal UE may schedule UL resources for data ACK messages using D-SR resources assigned using MAC message of block 24c.

Abbreviations
A/R Assign/Revoke
BSR Buffer Status Report (a MAC control element)
CBRA Contention Based Random Access
CFRA Contention Free Random Access
CQI Channel Quality Index
D-SR Dedicated SR
F3 PUCCH Format 3
MAC Medium Access Control
MT Message Type
PUCCH Physical Uplink Control Channel
RA-SR Random Access SR
RRC Radio Resource Control
SR Scheduling Request
TTI Transmission Time Interval
UL-SCH Uplink Shared (a Transport Channel)

Further Definitions

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/ operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor (also referred to as a processor circuit) such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the following claims and their equivalents, and shall not be restricted or limited by the foregoing detailed description.

That which is claimed is:

1. A method of operating a base station of a radio access network (RAN), the method comprising:

transmitting a Medium Access Control (MAC) message from a node of the RAN to a wireless terminal, wherein the MAC message includes a Control Element (CE) defining a first assignment of resources for dedicated scheduling requests (D-SRs) available for the wireless terminal to transmit dedicated scheduling requests to the node, wherein the CE includes a code frequency domain index field with a code frequency domain index identifying one of a plurality of code frequency domain resources available for the wireless terminal to transmit dedicated scheduling requests and a first time domain index field with a first time domain index identifying one of a first plurality of time domain resources available for the wireless terminal to transmit dedicated scheduling requests; and after transmitting the MAC message, transmitting a Radio Resource Control (RRC) message from the node of the RAN to the wireless terminal, wherein the RRC message includes a second time domain index field larger than the first time domain index field with a second time domain index identifying one of a second plurality of time domain resources available for the wireless terminal to transmit dedicated scheduling requests, and wherein the first plurality of time domain resources is different than the second plurality of time domain resources.

2. The method of claim 1 wherein the first plurality of time domain resources is a subset of the second plurality of time domain resources.

3. The method of claim 1 wherein the first plurality of time domain resources and the second plurality of time domain resources are mutually exclusive.

4. The method of claim 1 wherein the code frequency domain index field is a first code frequency domain index field, wherein the code frequency domain index is a first code frequency domain index, wherein the plurality of code frequency domain resources is a first plurality of code frequency domain resources, wherein the RRC message includes a second code frequency domain index field larger than the first code frequency domain index field with a second code frequency domain index identifying one of a second plurality of code frequency domain resources available for the wireless terminal to transmit dedicated scheduling requests, and wherein the first plurality of code frequency domain resources is different than the second plurality of code frequency domain resources.

5. The method of claim 1 further comprising:
before transmitting the MAC message, transmitting a Physical Downlink Control Channel (PDCCH) order to the wireless terminal to initiate a downlink data transmission of downlink data;
receiving a response to the PDCCH order from the wireless terminal; and
responsive to receiving the response to the PDCCH order, transmitting a downlink assignment to the wireless terminal, wherein the MAC message is transmitted in accordance with the downlink assignment and wherein the downlink data is multiplexed with the Control Element in the MAC message.

6. The method of claim 1 further comprising:
before transmitting the MAC message, receiving a contention based random access, CBRA, preamble from the wireless terminal;
responsive to receiving the CBRA preamble, transmitting a downlink assignment to the wireless terminal, wherein the MAC message is transmitted in accordance with the downlink assignment to the wireless terminal.

7. The method according to claim 1 wherein the first assignment of resources defines a time domain for the resources available for the wireless terminal to transmit dedicated scheduling requests, wherein the time domain is defined based on a subframe time offset and a time periodicity.

8. The method of claim 7 further comprising:
after transmitting the MAC CE message including the first assignment of resources, receiving a dedicated scheduling request from the wireless terminal over a Physical Uplink Control Channel (PUCCH) using one of the resources defined according to the subframe time offset and the time periodicity;
responsive to receiving the dedicated scheduling request over the PUCCH, transmitting an uplink scheduling assignment to the wireless terminal for a Physical Uplink Shared Channel (PUSCH); and
after transmitting the uplink scheduling assignment, receiving uplink data from the wireless terminal over the PUSCH in accordance with the uplink scheduling assignment.

9. A method of operating a base station of a radio access network (RAN), the method comprising:
transmitting a first Medium Access Control (MAC) message from a node of the RAN to a wireless terminal, wherein the first MAC message includes a first Control Element (CE) defining an assignment of resources for dedicated scheduling requests (D-SRs) available for the wireless terminal to transmit dedicated scheduling requests to the node, and wherein the first Control Element includes a D-SR message type identifier and an Assign/Revoke field having a first Assign/Revoke value; and
responsive to determining to revoke the assignment of resources for dedicated scheduling requests, transmitting a second MAC message to the wireless terminal wherein the second MAC message includes a second Control Element (CE) including the D-SR message type identifier and an Assign/Revoke field having a second Assign/Revoke value different than the first Assign/Revoke value.

10. A base station of a radio access network (RAN), the base station comprising:
a transceiver configured to provide radio communications with a plurality of wireless terminals; and
a processor coupled to the transceiver, wherein the processor is configured to,
transmit a Medium Access Control (MAC) message from a node of the RAN through the transceiver to a wireless terminal, wherein the MAC message includes a Control Element (CE) defining a first assignment of resources for dedicated scheduling requests (D-SRs), available for the wireless terminal to transmit dedicated scheduling requests to the node, wherein the CE includes a code frequency domain index field with a code frequency domain index identifying one of a plurality of code frequency domain resources available for the wireless terminal to transmit dedicated scheduling requests and a first time domain index field with a first time domain index identifying one of a first plurality of time domain resources available for the wireless terminal to transmit dedicated scheduling requests, and
transmit a Radio Resource Control (RRC) message from the node of the RAN to the wireless terminal after transmitting the MAC message, wherein the RRC message includes a second time domain index field larger than the first time domain index field with a second time domain index identifying one of a second plurality of time domain resources available for the wireless terminal to transmit dedicated scheduling requests, and wherein the first plurality of time domain resources is different than the second plurality of time domain resources.

11. A method of operating a wireless terminal in a radio access network (RAN), the method comprising:
receiving a Medium Access Control (MAC) message from a node of the RAN, wherein the MAC message includes a Control Element (CE) defining a first assignment of resources for dedicated scheduling requests (D-SRs) available for the wireless terminal to transmit dedicated scheduling requests to the node, wherein the CE includes a code frequency domain index field with a code frequency domain index identifying one of a plurality of code frequency domain resources available for the wireless terminal to transmit dedicated scheduling requests and a first time domain index field with a first time domain index identifying one of a first plurality of time domain resources available for the wireless terminal to transmit dedicated scheduling requests; and after receiving the MAC message, receiving a Radio Resource Control (RRC) message from the node of the RAN, wherein the RRC message includes a second time domain index field larger than the first time domain index field with a second time domain index identifying one of a second plurality of time domain resources available for the wireless terminal to transmit dedicated scheduling requests, and wherein the first plurality of time domain resources is different than the second plurality of time domain resources.

12. The method of claim 11 wherein the first plurality of time domain resources is a subset of the second plurality of time domain resources.

13. The method of claim 11 wherein the first plurality of time domain resources and the second plurality of time domain resources are mutually exclusive.

14. The method of claim 11 wherein the code frequency domain index field is a first code frequency domain index field, wherein the code frequency domain index is a first code frequency domain index, wherein the plurality of code frequency domain resources is a first plurality of code frequency domain resources, wherein the RRC message includes a second code frequency domain index field larger than the first code frequency domain index field with a second code frequency domain index identifying one of a second plurality of code frequency domain resources available for the wireless terminal to transmit dedicated scheduling requests, and wherein the first plurality of code frequency domain resources is different than the second plurality of code frequency domain resources.

15. The method of claim 11 further comprising:
before receiving the MAC message, receiving an order from the node of the RAN to initiate a downlink data transmission of downlink data;
after receiving the order, receiving a downlink assignment from the node of the RAN, wherein the MAC message is received in accordance with the downlink assignment, and wherein the downlink data is multiplexed with the Control Element in the MAC message.

16. The method of claim 11 further comprising:
before receiving the MAC message, transmitting a contention based random access (CBRA) preamble to the node of the radio access network responsive to determining that uplink data is available for an uplink data transmission;
after transmitting the CBRA preamble, receiving a downlink assignment from the node of the radio access network, wherein the MAC message is received in accordance with the downlink assignment.

17. The method according to claim 11 wherein the first assignment of resources defines a time domain for the resources available for the wireless terminal to transmit dedicated scheduling requests, wherein the time domain is defined based on a subframe time offset and a time periodicity.

18. The method of claim 17 further comprising:
after receiving the MAC CE message including the first assignment of resources, transmitting a dedicated scheduling request over a Physical Uplink Control Channel (PUCCH) using one of the resources defined according to the subframe time offset and the time periodicity;
after transmitting the dedicated scheduling request over the PUCCH, receiving an uplink scheduling assignment for a Physical Uplink Shared Channel (PUSCH); and
after receiving the uplink scheduling assignment, transmitting uplink data from the wireless terminal over the PUSCH in accordance with the uplink scheduling assignment.

19. A method of operating a wireless terminal in a radio access network (RAN), the method comprising:
receiving a first Medium Access Control (MAC) message from a node of the RAN, wherein the first MAC message includes a first Control Element (CE) defining an assignment of resources for dedicated scheduling requests (D-SRs) available for the wireless terminal to transmit dedicated scheduling requests to the node, and wherein the first Control Element includes a D-SR message type identifier and an Assign/Revoke field having a first Assign/Revoke value;
after receiving the first MAC message, receiving a second MAC message from the node of the radio access network wherein the second MAC message includes a second Control Element (CE) including the D-SR message type identifier and an Assign/Revoke field having a second Assign/Revoke value different than the first Assign/Revoke value; and
after receiving the second MAC message including the Assign/Revoke field with the second Assign/Revoke value, transmitting a random access scheduling request to the node of the radio access network responsive to determining that uplink data is available for transmission.

20. A wireless terminal operating in a radio access network (RAN), the wireless terminal comprising:
a transceiver configured to provide radio communications with a node of the radio access network; and
a processor coupled to the transceiver, wherein the processor is configured to,
receive a Medium Access Control (MAC) message through the transceiver from the node of the radio access network, wherein the MAC message includes a Control Element (CE) defining a first assignment of resources for dedicated scheduling requests (D-SRs) available for the wireless terminal to transmit dedicated scheduling requests to the node, wherein the CE includes a code frequency domain index field with a code frequency domain index identifying one of a plurality of code frequency domain resources available for the wireless terminal to transmit dedicated scheduling requests and a first time domain index field with a first time domain index identifying one of a first plurality of time domain resources available for the wireless terminal to transmit dedicated scheduling requests; and
receive a Radio Resource Control (RRC) message from the node of the RAN after receiving the MAC message, wherein the RRC message includes a second time domain index field larger than the first time domain index field with a second time domain index identifying one of a second plurality of time domain resources available for the wireless terminal to transmit dedicated scheduling requests, and wherein the first plurality of time domain resources is different than the second plurality of time domain resources.

* * * * *